US011893968B2

(12) United States Patent
Sakata

(10) Patent No.: US 11,893,968 B2
(45) Date of Patent: Feb. 6, 2024

(54) ELECTRONIC MUSICAL INSTRUMENT, ELECTRONIC KEYBOARD MUSICAL INSTRUMENT, AND METHOD OF GENERATING MUSICAL SOUND

(71) Applicant: CASIO COMPUTER CO., LTD., Tokyo (JP)

(72) Inventor: Goro Sakata, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 308 days.

(21) Appl. No.: 17/192,203

(22) Filed: Mar. 4, 2021

(65) Prior Publication Data

US 2021/0295807 A1 Sep. 23, 2021

(30) Foreign Application Priority Data

Mar. 17, 2020 (JP) ................................. 2020-046458

(51) Int. Cl.
*G10H 1/053* (2006.01)
*G10H 1/00* (2006.01)
(Continued)

(52) U.S. Cl.
CPC ........... *G10H 1/053* (2013.01); *G10H 1/0091* (2013.01); *G10H 1/08* (2013.01); *G10H 1/125* (2013.01);
(Continued)

(58) Field of Classification Search
CPC ........ G10H 1/053; G10H 1/0091; G10H 1/08; G10H 1/125; G10H 1/346; G10H 2210/271
(Continued)

(56) References Cited

U.S. PATENT DOCUMENTS 4,649,783 A * 3/1987 Strong ..................... G10H 7/02 84/622
5,001,960 A * 3/1991 Katou .................. G10H 1/0066 84/742
(Continued)

FOREIGN PATENT DOCUMENTS

EP 1 811 495 A2 7/2007
EP 1811495 A2 * 7/2007 ........... G10H 1/0091
(Continued)

OTHER PUBLICATIONS

Notice of Reasons for Refusal dated Jul. 19, 2022 received in Japanese Patent Application No. JP 2020-046458.
(Continued)

*Primary Examiner* — Christina M Schreiber
(74) *Attorney, Agent, or Firm* — Scully, Scott, Murphy & Presser, P.C.

(57) ABSTRACT

An electronic musical instrument according to one embodiment includes playing operators specifying respective pitches, and at least one processor which is configured to execute processing of acquiring string sound data including a fundamental sound component and a harmonic tone component corresponding to a specified pitch, acquiring stroke sound waveform data that does not include the fundamental sound component and the harmonic tone component corresponding to the specified pitch but includes components other than the fundamental sound component and the harmonic tone component, and synthesizing the string sound data and stroke sound data corresponding to the stroke sound waveform data at a set ratio.

14 Claims, 14 Drawing Sheets

(51) Int. Cl.
*G10H 1/08* (2006.01)
*G10H 1/12* (2006.01)
*G10H 1/34* (2006.01)

(52) U.S. Cl.
CPC ....... *G10H 1/346* (2013.01); *G10H 2210/271* (2013.01)

(58) Field of Classification Search
USPC ........................................................... 84/622
See application file for complete search history.

(56) References Cited

U.S. PATENT DOCUMENTS

| | | | | |
|---|---|---|---|---|
| 5,025,703 A * | 6/1991 | Iba | G10H 3/18 | 84/681 |
| 5,804,751 A * | 9/1998 | Koseki | G10H 1/08 | 84/630 |
| 8,878,045 B2 * | 11/2014 | Koseki | G10H 3/26 | 84/622 |
| 2002/0046640 A1 * | 4/2002 | Kondo | G10H 1/053 | 84/615 |
| 2003/0131720 A1 * | 7/2003 | Sakurada | G10H 1/346 | 84/719 |
| 2015/0269922 A1 * | 9/2015 | Matsunaga | G10H 7/00 | 84/605 |
| 2018/0182364 A1 * | 6/2018 | Sakata | G10H 1/0008 | |
| 2018/0182365 A1 * | 6/2018 | Sakata | G10H 1/125 | |
| 2018/0219521 A1 * | 8/2018 | Arimoto | G10H 1/08 | |
| 2018/0261196 A1 * | 9/2018 | Tajika | G10H 1/0091 | |
| 2018/0261198 A1 * | 9/2018 | Tajika | G10H 1/344 | |
| 2020/0111463 A1 * | 4/2020 | Sakata | G10H 5/007 | |
| 2021/0074250 A1 * | 3/2021 | Kojima | G10H 1/057 | |
| 2021/0090539 A1 * | 3/2021 | Sakata | G10H 7/06 | |
| 2021/0295806 A1 * | 9/2021 | Sakata | G10H 1/188 | |
| 2021/0295807 A1 * | 9/2021 | Sakata | G10H 1/346 | |

FOREIGN PATENT DOCUMENTS

| | | | |
|---|---|---|---|
| JP | H03-98094 A | 4/1991 | |
| JP | H11-95745 | 4/1999 | |
| JP | 2005-300798 A | 10/2005 | |
| JP | 2008-3395 A | 1/2008 | |
| JP | 2013061541 A * | 4/2013 | G10H 1/0091 |
| JP | 2015-143764 A | 8/2015 | |
| JP | 6176133 B2 | 8/2017 | |

OTHER PUBLICATIONS

Extended European Search Report dated Aug. 10, 2021 received in European Patent Application No. EP 21160406.1.

* cited by examiner

ELECTRONIC MUSICAL INSTRUMENT, ELECTRONIC KEYBOARD MUSICAL INSTRUMENT, AND METHOD OF GENERATING MUSICAL SOUND

CROSS-REFERENCE TO RELATED APPLICATIONS

This application is based upon and claims the benefit of priority from Japanese Patent Application No. 2020-046458, filed Mar. 17, 2020, the entire contents of which are incorporated herein by reference.

BACKGROUND OF THE INVENTION

1. Field of the Invention

The present invention relates to an electronic musical instrument, an electronic keyboard musical instrument, and a method of generating a musical sound.

2. Description of the Related Art

A technique of a resonance sound generating apparatus capable of simulating resonance sound of an acoustic piano more faithfully has been proposed (for example, Jpn. Pat. Appln. KOKAI Publication No. 2015-143764).

SUMMARY OF THE INVENTION

According to one aspect of the present invention, there is provided an electronic musical instrument comprising: a plurality of playing operators specifying respective pitches; and at least one processor, wherein the at least one processor is configured to execute processing of: acquiring string sound data including a fundamental sound component and a harmonic tone component corresponding to a specified pitch; acquiring stroke sound waveform data that does not include the fundamental sound component and the harmonic tone component corresponding to the specified pitch but includes components other than the fundamental sound component and the harmonic tone component; and synthesizing the string sound data and stroke sound data corresponding to the stroke sound waveform data at a set ratio.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments in the case where the present invention is applied to an electronic musical instrument will be described in detail with reference to drawings.

[Configuration]

Figure 1:
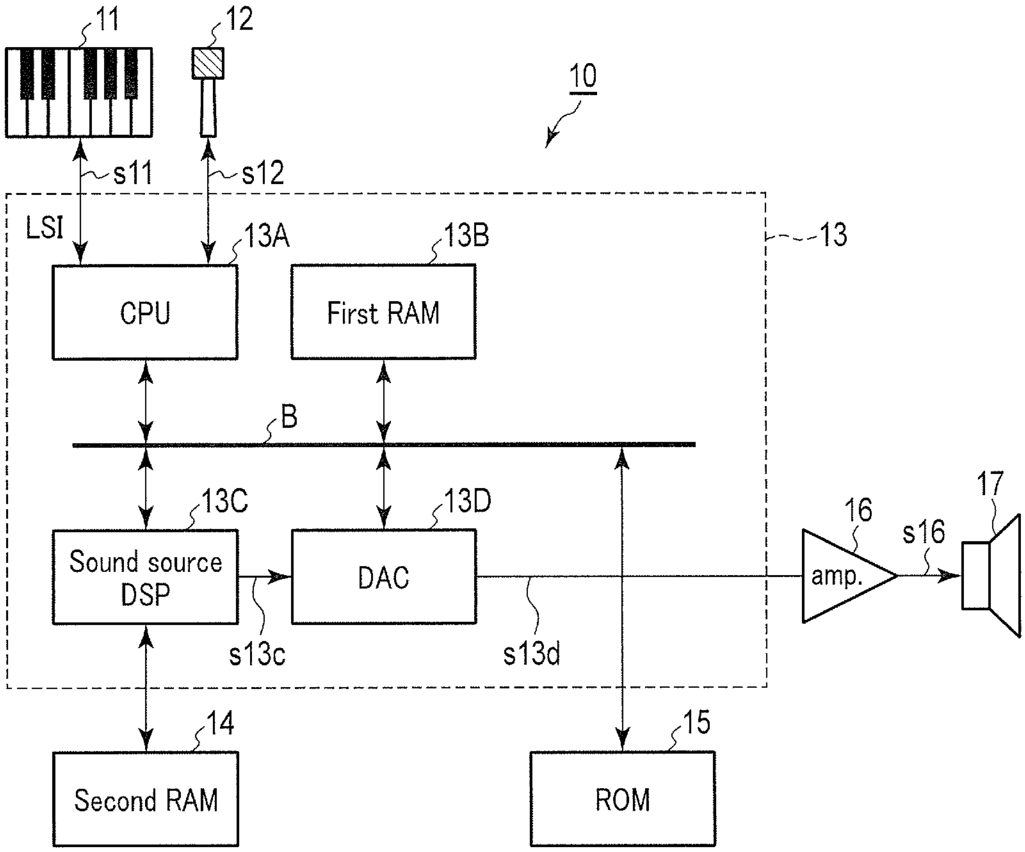
FIG. 1 is a block diagram showing the configuration of a basic hardware circuit of an electronic keyboard musical instrument according to an embodiment of the present invention.

FIG. 1 is a block diagram showing the configuration of a basic hardware circuit in the case where the present embodiment is applied to an electronic keyboard musical instrument 10. In the same figure, an operation signal s11 including a note number (pitch information) and a velocity value (key-pressing speed) as sound volume information, which is generated according to the operation at a keyboard unit 11 serving as playing operators, and a damper-on/off operation signal s12, which is generated according to the operation at a damper pedal 12, are input in a CPU 13A of an LSI 13.

The LSI 13 connects, via a bus B, the CPU 13A, a first RAM 13B, a sound source DSP (digital signal processor) 13C, and a D/A converting unit (DAC) 13D.

The sound source DSP 13C is connected with a second RAM 14 outside the LSI 13. The bus B is also connected with a ROM 15 outside the LSI 13.

The CPU 13A controls overall operations of the electronic keyboard musical instrument 10. The ROM 15 stores excitation signal data, etc. for operation programs or playing (music performance) performed by the CPU 13A. The first RAM 13B functions as a buffer memory for delaying a signal generating musical sound, such as a closed loop circuit.

The second RAM 14 is a work memory in which the CPU 13A and the sound source DSP 13C develop and store an operation program. The CPU 13A gives a parameter, such as a note number, a velocity value, and resonance parameters (resonance level indicating a level of damper resonance and/or a level of string resonance) accompanying a tone, to the sound source DSP 13C during the playing operation.

The sound source DSP 13C reads an operation program and/or fixed data stored in the ROM 15, develops and stores them in the second RAM 14 serving as the work memory, and executes the operation program. Specifically, in response to the parameter given from the CPU 13A, the sound source DSP 13C reads the waveform data of an excitation signal to generate necessary string sound from the ROM 15, adds the waveform data to processing in the closed loop circuit, synthesizes outputs of a plurality of the closed loop circuits, and generates waveform data of string sound.

The sound source DSP 13C also reads waveform data of stroke sound different from string sound from the ROM 15, and generates stroke sound waveform data acquired by regulating amplitude and sound quality in accordance with velocity for each of channels assigned to the notes to be generated.

In addition, the sound source DSP 13C synthesizes pieces of generated waveform data of the string sound and the stroke sound, and outputs the synthesized musical sound data s13*c* to the D/A converting unit 13D.

The D/A converting unit 13D converts the musical sound data s13*c* into an analog signal (s13*d*), and outputs the analog signal to an amplifier (amp.) 16 outside the LSI 13. With an analog musical sound signal s16 amplified with the amplifier 16, a speaker 17 speech-amplifies and emits musical sound.

The hardware circuit configuration shown in FIG. 1 can be achieved with software. When the configuration is achieved with a personal computer (PC), the functional hardware circuit configuration is different from the details shown in FIG. 1.

Figure 2:
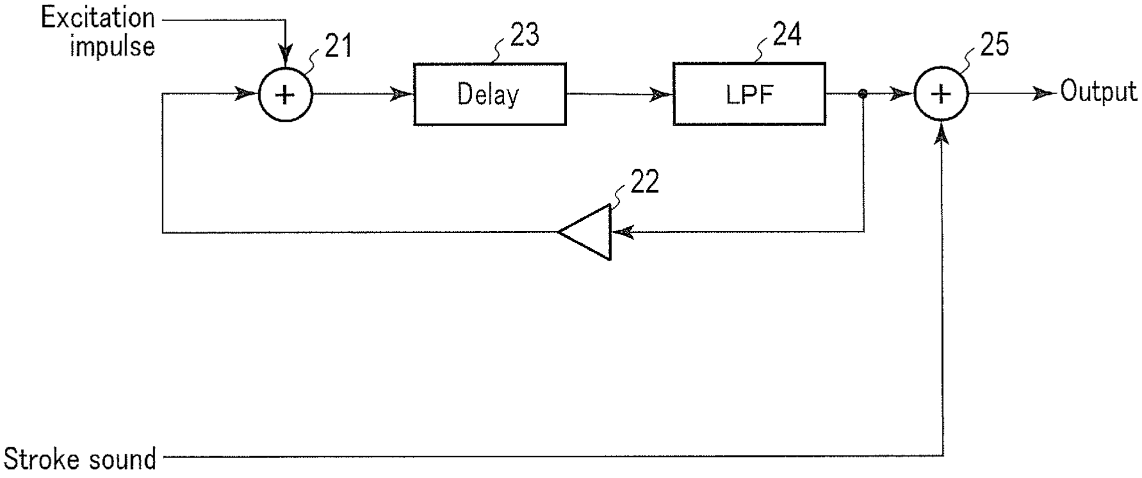
FIG. 2 is a block diagram showing the conceptual configuration of basic signal processing by a sound source DSP according to the embodiment.

FIG. 2 is a block diagram showing the conceptual configuration of basic signal processing by the sound source DSP 13C. As shown in FIG. 2, the waveform data of string sound is generated by the closed loop circuit of a physical model including an adder 21, a delay circuit 23, a low-pass filter (LPF) 24, and an amplifier 22, while the waveform data of stroke sound generated by a later-described PCM sound source is added by an adder 25, and its sum output is output as comprehensive musical sound data.

The adder 21 adds the waveform data of string sound by a later-described impulse signal read out of the ROM 15 and a feedback input signal output from the amplifier 22, and transmits its sum output to the delay circuit 23.

The delay circuit 23, to which a delay time for string length corresponding to the pitch of an assigned note is set, and outputs a delayed signal to the low-pass filter 24. The low-pass filter 24 passes a low frequency component according to a set cutoff frequency, and causes a temporal change in the sound quality of string sound, and its passing output is output to the adder 25 and the amplifier 22 as the waveform data of string sound. The amplifier 22 applies attenuation according to a given feedback value to the waveform data of string sound and feeds it back to the adder 21.

As described above, the waveform data of string sound is generated by the physical model using the closed loop circuit, while the waveform data of stroke sound, which cannot be continuously generated, is generated by the PCM sound source, and they are added by the adder 25 to complement, and good and natural musical sound data is generated.

Figure 3:
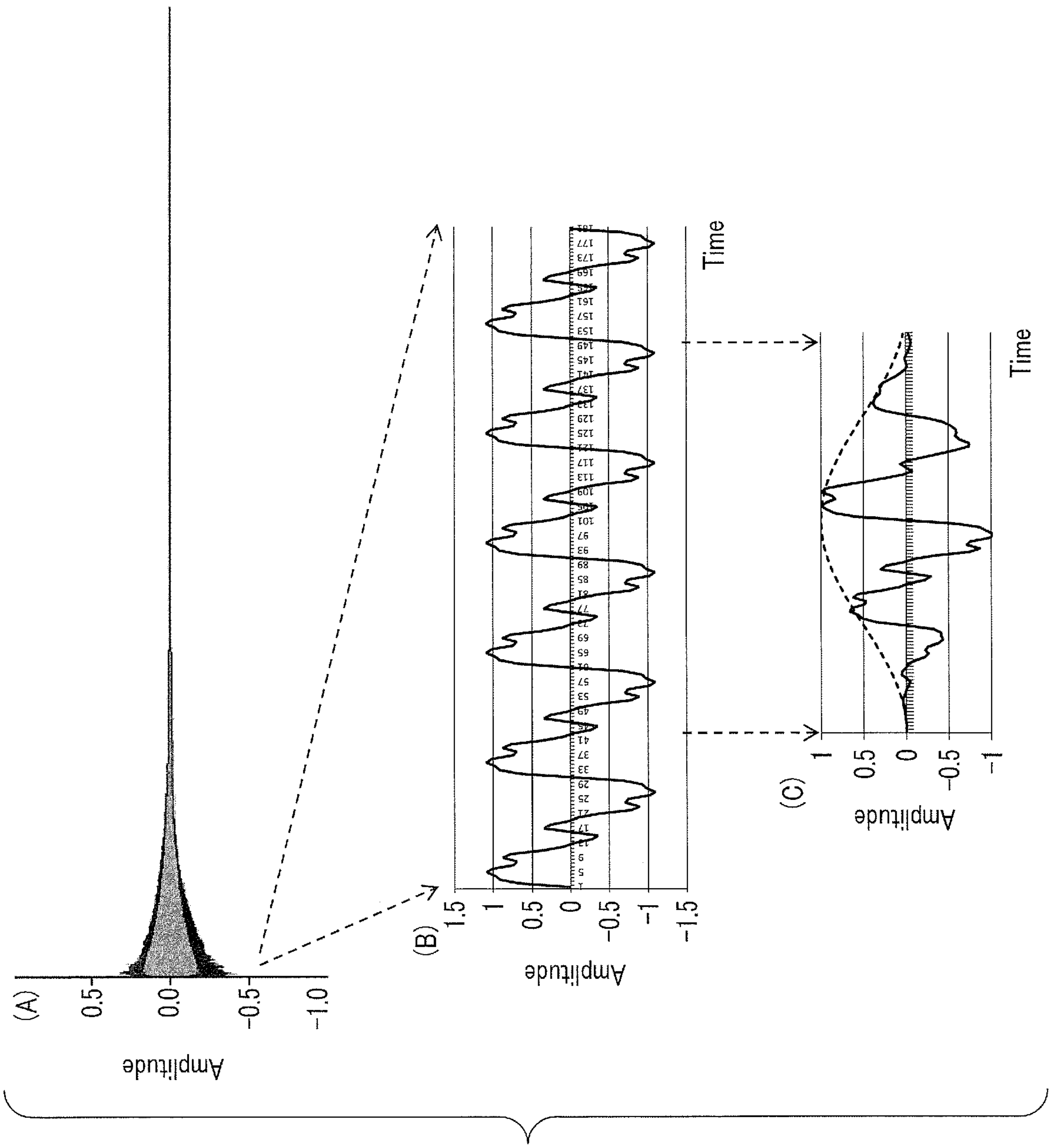
FIG. 3 is a diagram illustrating a principle of generating waveform data of string sound by an excitation impulse according to the embodiment.

FIG. 3 is a diagram illustrating a principle of generating waveform data of string sound by the excitation impulse. FIG. 3 (A) shows the process of attenuation from the beginning of generation of piano musical sound. FIG. 3 (B) shows waveform data at the beginning of generation of musical sound, that is, immediately after a string starts vibrating. FIG. 3 (C) illustrates a waveform after window-multiplying processing of extracting only two to three wavelengths from the waveform shown in FIG. 3 (B) and then multiplying them by a window function, for example, a Hanning window. Like this, the waveform data is used as the excitation signal. In the electronic keyboard musical instrument according to the present invention, it is alright as long as the sound source LSI 13 can acquire the excitation signal corresponding to a note number (pitch of a pressed key) and a velocity value (key-pressing speed) regardless of which key and how strong a user presses, and it does not matter how it is realized.

The acquired excitation signal is input to a corresponding or determined string sound model channel 63 from among a plurality of string sound model channels 63 described later, and string sound is generated.

Figure 4:
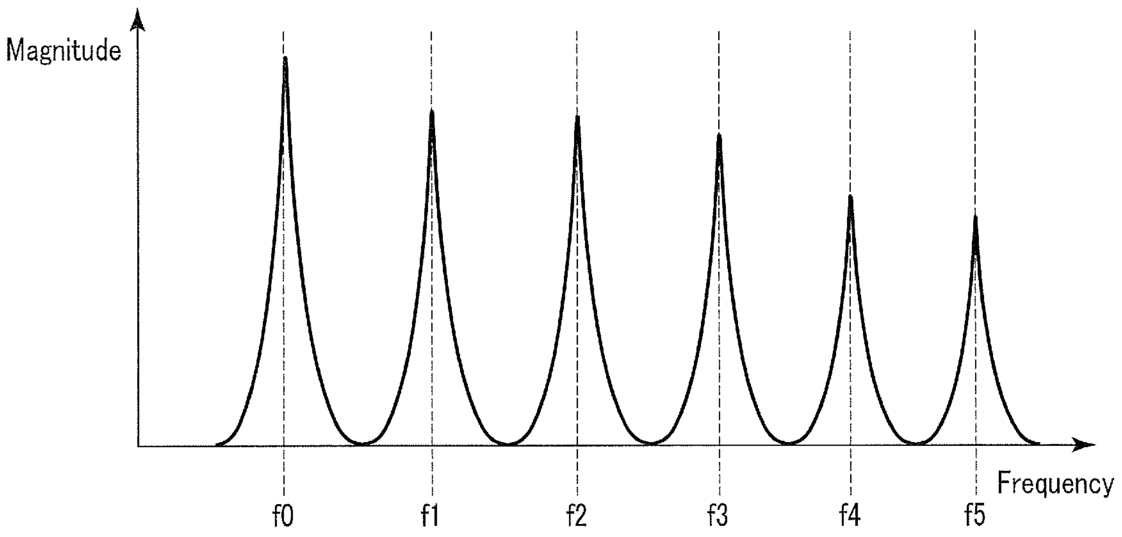
FIG. 4 is a diagram illustrating a frequency spectrum of fundamental sound and harmonic tone of string sound according to the embodiment.

FIG. 4 is a diagram illustrating a frequency spectrum of the string sound generated by the generation method as described above. As shown, it has a frequency spectrum in which a peak-shaped fundamental sound f0 and its harmonic tones f1, f2, . . . continue.

By performing a process for shifting the frequency components of the fundamental sound f0 and its harmonic tones f1, f2, . . . with respect to the waveform data of the string sound of the frequency spectrum as described above stored in the ROM 15, waveform data of string sound of a plurality of different pitches can also be generated.

The string sound that can be generated by the physical model as described above only includes a fundamental sound component and harmonic tones, as shown in FIG. 4. By contrast, musical sound generated by an original musical instrument contains a musical sound component that should be called stroke sound, and the musical sound component that should be called stroke sound characterizes musical sound of the musical instrument. Therefore, in the electronic musical instrument, it is desirable to generate this stroke sound and synthesize it with string sound.

In the present embodiment, for example, in an acoustic piano, the stroke sound includes sound components, such as sound of collision generated when a hammer collides with string inside the piano by key-pressing, operating sound of the hammer, key-stroke sound by a finger of a piano player, and sound generated when the key hits on a stopper and stops, and does not include components (fundamental sound component and harmonic tone component of each key) of pure string sound. The stroke sound is not always limited to physical stroke operation sound itself generated at key-pressing.

In generating the stroke sound, the waveform data of the recorded musical sound is first subjected to window-multiplying processing by a window function such as the Hanning window, and then converted into frequency dimension data by FFT (Fast Fourier Transform).

For the converted data, the frequencies of the base sound and harmonic tones are determined based on data that can be observed from the recorded waveform, such as pitch information of the recorded waveform data, harmonic tones to be removed, and deviation of harmonic tone frequencies from the base sound, arithmetic processing is performed so that the amplitude of result data at those frequencies becomes 0, and thereby the frequency components of the string sound are removed.

For example, when a fundamental sound frequency is 100 [Hz], frequencies at which the frequency component of the string sound is removed by multiplication by a multiplier of 0 are 100 [Hz], 200 [Hz], 400 [Hz], 800 [Hz], . . . .

Here, the harmonic tones are assumed to be exactly integral multiples, but since the frequencies of actual musical instruments deviate slightly, using harmonic tone frequencies observed from the waveform data obtained by recording can cope with more appropriately.

After that, the waveform data of the stroke sound can be generated by converting the data obtained by removing the frequency component of the string sound into time dimension data by IFFT (Inverse Fast Fourier Transform).

Figure 5:
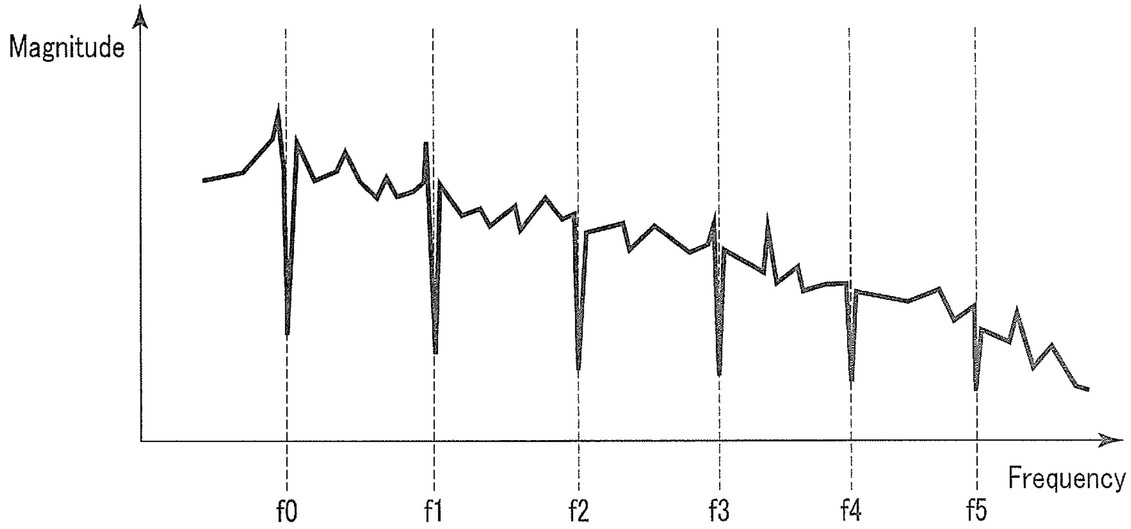
FIG. 5 is a diagram illustrating a frequency spectrum of stroke sound according to the embodiment.

FIG. 5 is a diagram illustrating a frequency spectrum of musical sound of stroke sound. The waveform data of the stroke sound having such a frequency spectrum is stored in the ROM 15.

Figure 6:
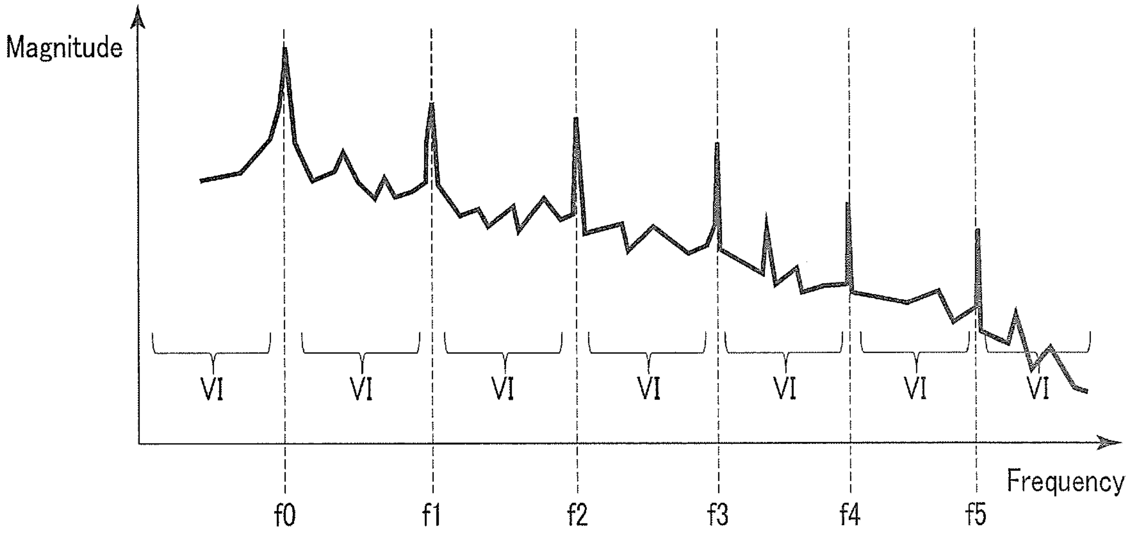
FIG. 6 is a diagram illustrating a frequency spectrum of musical sound according to the embodiment.

By performing addition synthesis of the waveform data of the stroke sound of FIG. 5 and the waveform data of the string sound generated from the physical model shown in FIG. 4, a musical sound having a frequency spectrum as shown in FIG. 6 is generated.

That is, FIG. 6 is a diagram illustrating a frequency spectrum of musical sound generated when a note with a pitch f0 on the piano is key-pressed. As shown, the musical sound of the acoustic piano can be reproduced by synthesizing a string sound in which the peak-shaped fundamental sound f0 and its harmonic tones f1, f2, . . . continue and a stroke sound generated in gaps VI, VI, . . . of the peak-shaped string sound.

Figure 7:
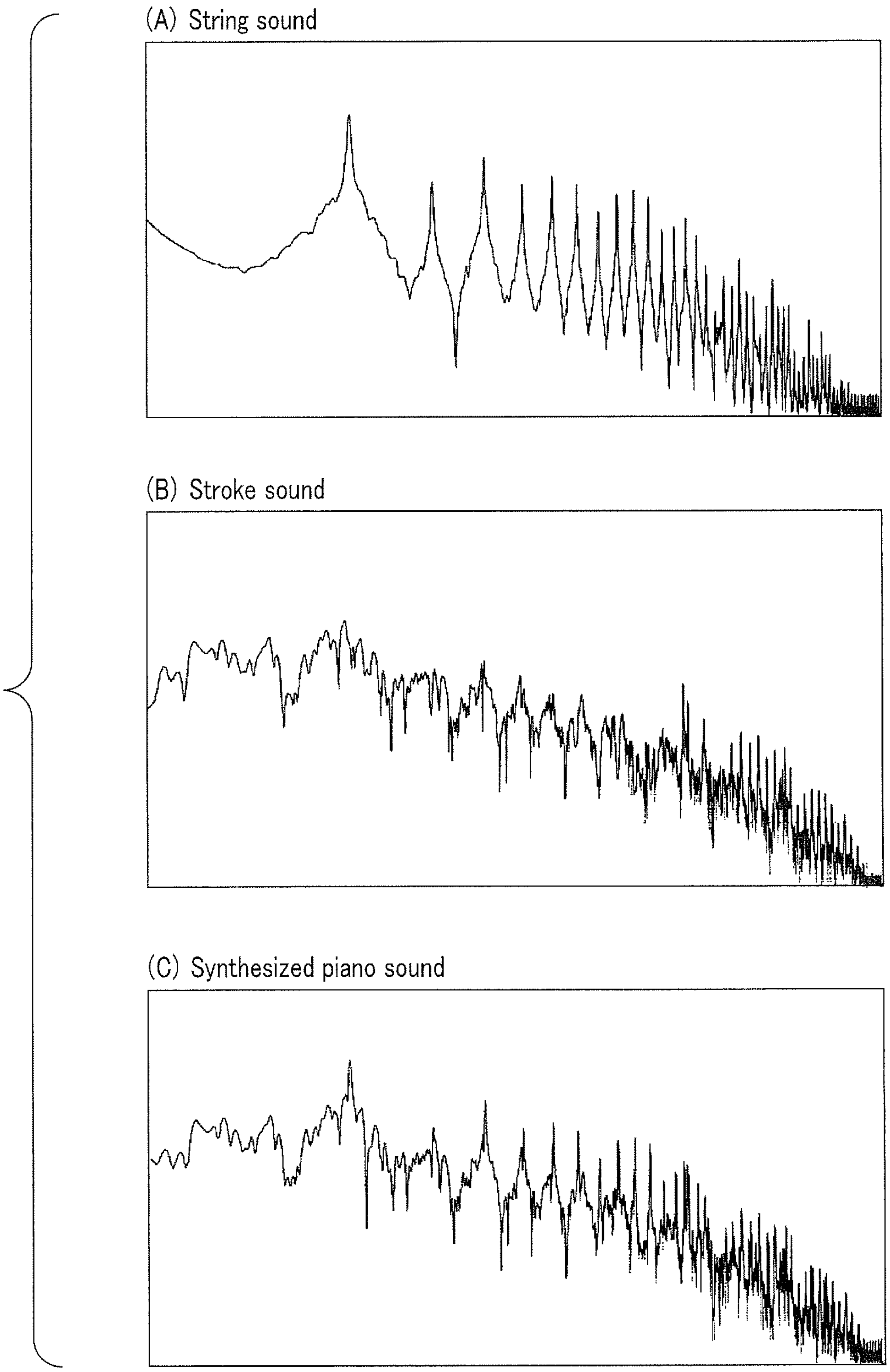
FIG. 7 is a diagram illustrating a specific example of each piece of waveform data forming piano musical sound and waveform data of piano musical sound acquired by addition synthesis according to the embodiment.

FIG. 7 is a diagram illustrating a specific example of each piece of waveform data forming piano musical sound and waveform data of piano musical sound acquired by addition synthesis. The waveform data of the string sound having a frequency spectrum shown in FIG. 7 (A) is generated by the physical model, whereas the waveform data of the stroke sound having a frequency spectrum as shown in FIG. 7 (B) is read by the PCM sound source. By performing addition synthesis of those, it is possible to generate a natural piano musical sound as shown in FIG. 7 (C).

Figure 8:
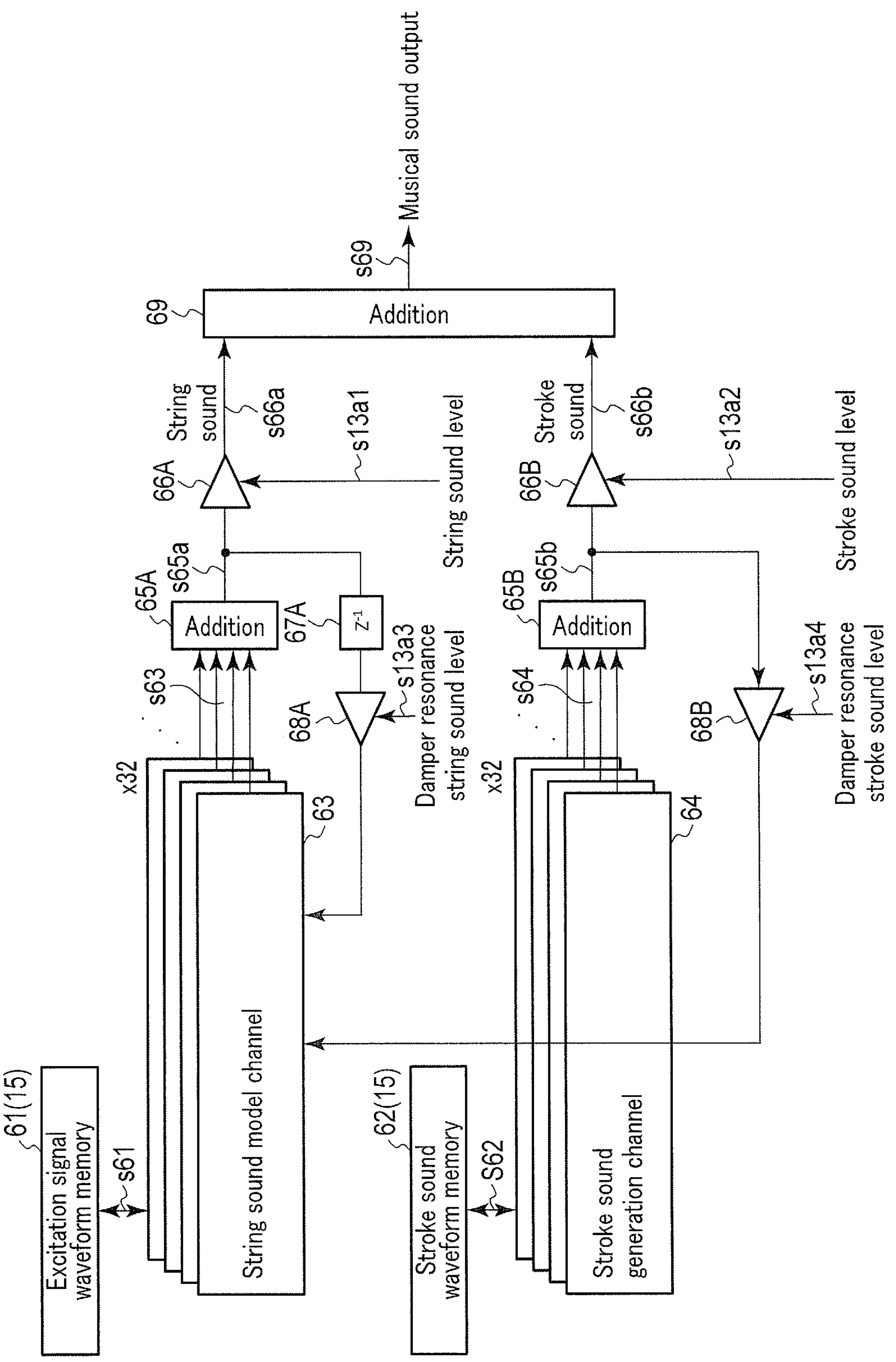
FIG. 8 is a block diagram illustrating the functional configuration of a hardware circuit having the sound source channels of respective string sound and stroke sound at the implementation level according to the embodiment.

FIG. 8 is a block diagram illustrating the functional configuration of an entire hardware circuit at an implementation level by the sound source DSP 13C having the sound source channels of each of the string sound and the stroke sound.

To change the musical sound acquired by synthesizing the string sound and the stroke sound into complete piano musical sound, a plurality of channels are provided for each of the string sound and the stroke sound, for example, 32 channels for each.

Specifically, string sound excitation signal waveform data s61 is read out of an excitation signal waveform memory 61 in response to a note-on signal, and string sound channel waveform data s63 is generated by closed loop processing at each of string sound model channels 63 formed of 32 channels at most, and output to an adder 65A. An addition result synthesized at the adder 65A is output as string sound waveform data s65*a*, attenuated with an amplifier 66A in accordance with the string sound level transmitted from the CPU 13A, and thereafter input to an adder 69.

In addition, the string sound waveform data s65*a* output from the adder 65A is delayed with a delay retaining unit 67A by one sampling cycle (Z-1), then attenuated with an amplifier 68A in accordance with the damper resonance string sound level from the CPU 13A, and fed back to the string sound model channels 63.

By contrast, stroke sound waveform data s62 is read out of a stroke sound waveform memory 62 in response to a note-on signal, and stroke sound channel waveform data s64 is generated at each of stroke sound generation channels 64 formed of 32 channels at most, and output to an adder 65B. An addition result synthesized at the adder 65B is output as stroke sound waveform data s65*b*, attenuated with an amplifier 66B in accordance with the stroke sound level transmitted from the CPU 13A, and thereafter input to the adder 69.

In addition, the stroke sound waveform data s65*b* output from the adder 65B is attenuated with an amplifier 68B in accordance with the damper resonance stroke sound level from the CPU 13A, and input to the string sound model channels 63.

The adder 69 synthesizes the string sound waveform data s66*a* input via the amplifier 66A with the stroke sound waveform data s66*b* input via the amplifier 66B by addition processing, and outputs synthesized musical sound data s69.

A string sound level signal s13*al* output with the CPU 13A to the amplifier 66A and designating the attenuation rate and a stroke sound level signal s13*a*2 output to the amplifier 66B and also designating the attenuation rate indicate the addition rate of the string sound to the stroke sound, and serve as parameters set according to the preset piano tone and/or the user's liking.

In addition, a damper resonance string sound level signal s13*a*3 output with the CPU 13A to the amplifier 68A and a damper resonance stroke sound level signal s13*a*4 output to the amplifier 68B are parameters that can be set differently from the string sound level signal and the stroke sound level signal described above.

This is because, in an actual acoustic piano, the sound generated as the main sound is generated through the whole structure, such as the bridge of the piano string, the soundboard, and the body, and a difference in sound quality is generated from the resonance sound generated through the bridge serving as the main transmission path of resonance between the strings. For this reason, the structure enabling adjustment of the difference is adopted. Generally, the sound transmitted through the bridge transmission path is set such that the stroke sound component is set relatively large, and thereby the damper resonance sound can be generated as sound similar to sound of the acoustic piano.

In addition, when it is desired to set the string resonance quantity generated at the time when the damper pedal 12 is not trodden on separately from the damper resonance quantity at the time when the damper pedal 12 is trodden on, control may be performed to change the levels of damper resonance (stroke sound and string sound) individually in accordance with the treading state of the damper pedal 12.

For example, in the case of resonance sound (string resonance) in a damper-on state in which the damper pedal 12 is not trodden on, because sound close to pure sound is generated as resonance sound, setting with relatively small stroke sound is conceivable. In addition, in the case of resonance sound (damper resonance) in a damper-off state in which the damper pedal 12 is trodden on, because sound excited with stroke sound and having a wide frequency band is generated as resonance sound, setting with relatively large stroke sound is conceivable.

Figure 9:
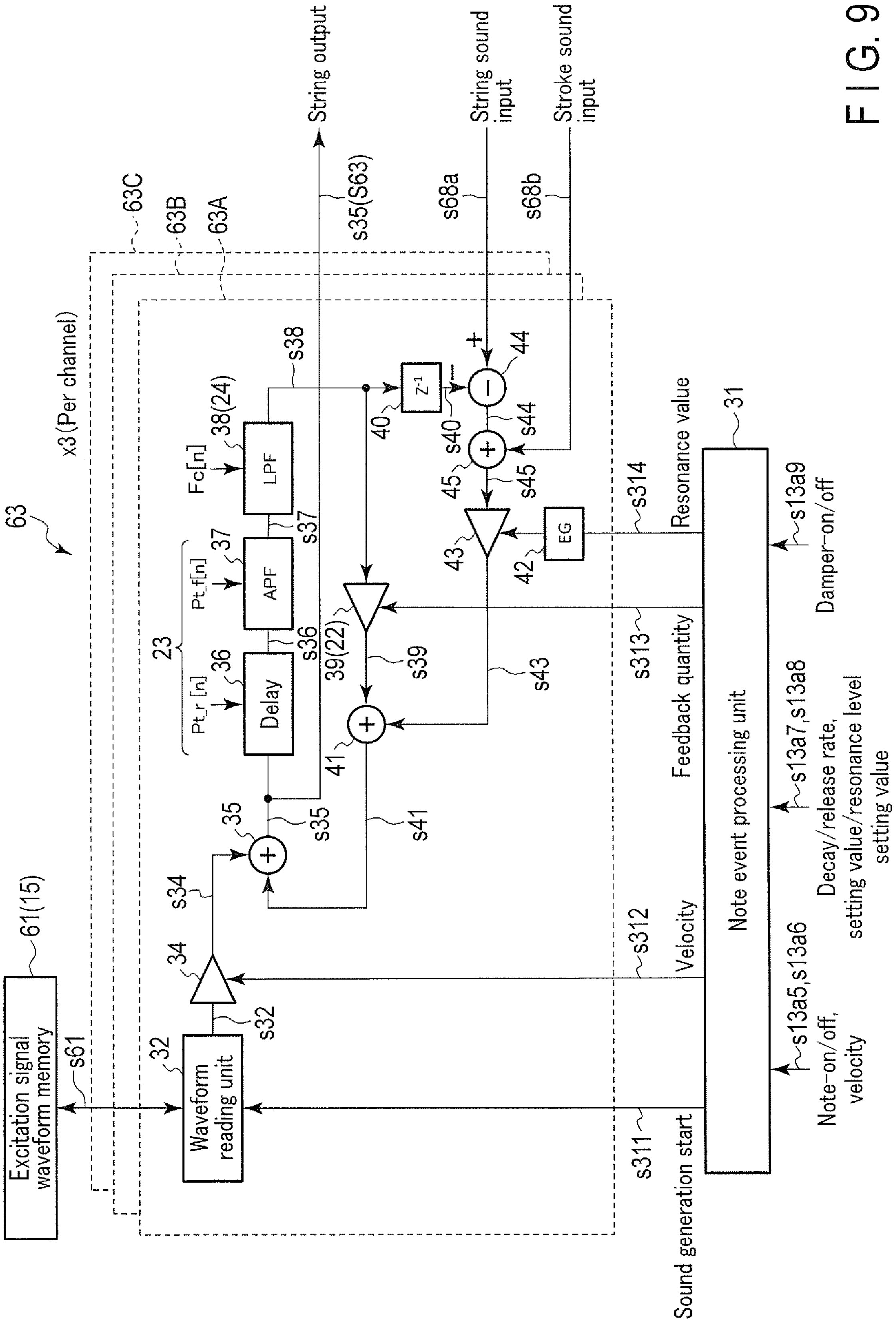
FIG. 9 is a block diagram mainly showing the signal processing configuration of a string sound model channel according to the embodiment.

FIG. 9 is a block diagram mainly showing the detailed circuit configuration of the string sound model channel 63 in FIG. 8. In FIG. 9, ranges 63A to 63C enclosed with broken lines in the drawing each correspond to a channel, excluding a note event processing unit 31 described later and the excitation signal waveform memory 61 (ROM 15).

Specifically, the electronic keyboard musical instrument 10 is provided with a signal circulation circuit for a model of one (lowest register), two (low register), or three (medium register and/or higher register) strings per key, in conformity with an actual acoustic piano. FIG. 9 illustrates the structure including a common signal circulation circuit corresponding to the three-string model by dynamic assignment correspondence.

The following explanation is made with an example of a string sound model channel 63A serving as one of signal circulation circuits of the three-string model.

The note event processing unit 31 is provided with a note-on/off signal s**13*a*5, a velocity signal s13*a*6, a decay (attenuation)/release (lingering sound) rate setting signal s13*a*7, a resonance level setting value signal s13*a*8, and a damper-on/off signal s13*a*9, from the CPU 13A. The note event processing unit 31 transmits a sound generation start signal s311 to a waveform reading unit 32, a velocity signal s312 to an amplifier 34, a feedback quantity signal s313 to an amplifier 39, a resonance value signal s314 to an envelope generator (EG) 42, an integer part Pt_r [n] of string length delay in accordance with the pitch to a delay circuit 36, a decimal part Pt_f [n] of the string length delay to an all-pass filter (APF) 37, and a cut-off frequency Fc [n] to a low-pass filter (LPF) 38**.

The waveform reading unit 32 that has received the sound generation start signal s311 from the note event processing unit 31 reads excitation signal waveform data s61 having been subjected to window-multiplying processing from the excitation signal waveform memory 61, and outputs the excitation signal waveform data s61 as signal s32 to the amplifier 34. The amplifier 34 regulates the level of the excitation signal waveform data s61 with the attenuation quantity corresponding to the velocity signal s312 transmitted from the note event processing unit 31, and outputs the excitation signal waveform data s61 to an adder 35.

The adder 35 is also provided with waveform data s41 acquired by adding the string sound and the stroke sound as a sum output from an adder 41. The adder 35 directly outputs a sum output acquired as a result of addition and serving as string sound channel waveform data s35 (s63) to the adder 65A of the subsequent stage, and also outputs the sum output to the delay circuit 36 forming a closed loop circuit.

In the delay circuit 36, a string length delay Pt_r [n] has been set by the note event processing unit 31, as a value according to an integer part of a single wavelength of sound output when the string vibrates in the acoustic piano (e.g., an integer "20" when the sound corresponds to a high note key, and an integer "2000" when the sound corresponds to a low note key), and the delay circuit 36 delays the channel waveform data s35 by the string length delay Pt_f [n] and outputs the channel waveform data s35 to the all-pass filter (APF) 37.

In the all-pass filter 37, a string length delay Pt_f [n] has been set by the note event processing unit 31, as a value according to a decimal part of the single wavelength, and the all-pass filter 37 delays the waveform data s36 of the delay circuit 36 by the string length delay Pt_f [n] and outputs the waveform data s36 to the low-pass filter (LPF) 38. That is, the delay circuit 36 and the all-pass filter 37, which form the delay circuit 23 in FIG. 2, delay the waveform data for the time determined in accordance with the note number information (pitch information) (the time for a single wavelength).

The low-pass filter 38 corresponds to the low-pass filter 24 in FIG. 2 and passes the waveform data s37 of the all-pass filter 37 on the lower frequency side than a cut-off frequency Fc [n] for high register attenuation set for the frequency of the string length by the note event processing unit 31, and outputs the waveform data s37 to an amplifier 39 and a delay retaining unit 40.

The amplifier 39, that is, the amplifier 22 in FIG. 2, attenuates the output data s38 from the low-pass filter 38 in accordance with the feedback quantity signal s313 provided from the note event processing unit 31, and thereafter outputs the output data s38 to the adder 41. The feedback quantity signal s313 is set in accordance with a value according to the rate of decay (attenuation) in the key-pressing state and the damper-off state, whereas it is set in accordance with a value according to the rate of release (lingering sound) in the non-key-pressing state and the damper-on state. The feedback quantity signal s313 is set smaller when the ratio of release (lingering sound) is high. In such a case, sound is attenuated early, and the degree of resonance of string sound becomes low.

The delay retaining unit 40 retains the waveform data output from the low-pass filter 38 only for one sampling cycle (Z-1), and outputs the waveform data to a subtracter 44 as a subtrahend.

The subtracter 44 is also provided with string sound output data s**68*a* for resonance sound of the previous sampling cycle and acquired by superimposing all the string models from the amplifier 68A. The subtracter 44 uses as the subtrahend output data s40 for its own string model, which is output from the low-pass filter 38 via the delay retaining unit 40, and outputs output data s44 serving as a difference to an adder 45**.

The adder 45 is also provided with stroke sound waveform data s**68*b* from the amplifier 68B, and supplies waveform data s45 serving as a sum output of addition of them to the amplifier 43. The amplifier 43 subjects the waveform data s45 to attenuation processing based on a signal s42 provided from the envelope generator 42 and indicating a sound volume according to the stage of ADSR (Attach (rise)/Decay (attenuation)/Sustain (retaining after attenuation)/Release (lingering sound)) changing with a lapse of time according to the resonance value from the note event processing unit 31, and outputs attenuated output data s43 to the adder 41**.

The adder 41 adds its string model waveform data s39 output from the amplifier 39 and the waveform data s43 of the resonance sound of the whole string sound and stroke sound output from the amplifier 43, and supplies waveform data s41 serving as a sum output of them to the adder 35 to perform feedback input to the resonance sound closed loop circuit.

When the note-on signal s**13*a*5 is input to the note event processing unit 31, the velocity signal s312 input to the amplifier 34, the integer part Pt_r [n] of the delay time input to the delay circuit 36 according to the pitch, the decimal part string length delay Pt_f [n] of the delay time input to the all-pass filter 37, the cut-off frequency Fc [n] of the low-pass filter 38, the feedback quantity signal s313 input to the amplifier 39, and the resonance value signal s314 input to the envelope generator 42** are set to respective predetermined levels, before sound generation is started.

When the sound generation start signal s311 is input to the waveform reading unit 32, waveform data s34 of the excitation signal corresponding to the predetermined velocity signal s312 is supplied to the closed loop circuit, and sound generation is started in accordance with the set tone change and delay time.

Thereafter, with the note-off signal s13*a*5 at the note, the feedback quantity signal s313 corresponding to the predetermined release (lingering sound) ratio is supplied to the amplifier 39, and the process changes to a sound deadening operation.

In the key-pressing state and the damper-off state, the feedback quantity signal s314 supplied to the envelope generator 42 is set to a value in accordance with the delay quantity at the delay circuit 36 and the all-pass filter 37.

By contrast, in the non-key-pressing state and the damper-on state, the feedback quantity signal s314 supplied to the envelope generator 42 is set to a value in accordance with the sound volume in release (lingering sound).

As control for the feedback quantity signal s314 supplied to the envelope generator 42, the feedback quantity signal s314 is set smaller in the non-key-pressing state and the damper-on state, the sound is attenuated early, and resonance is relatively small.

In addition, in the non-key-pressing state and in the damper-off state, that is, in a state in which the damper pedal 12 is trodden on, a series of parameters in note-on described above are set in accordance with the damper-on/off signal s13*a*9. However, in the operation, no sound generation start signal s311 is transmitted to the waveform reading unit 32, and no waveform data s34 is input to the adder 35 via the waveform reading unit 32 and the amplifier 34.

In addition, in the key-pressing state and the damper-off state, input of the string sound waveform data s68*a* and input of the stroke sound waveform data s68*b* excite the closed loop circuit including the delay circuit 36, the all-pass filter 37, the low-pass filter 38, the amplifier 39, the amplifier 43, and the adder 41, and resonance sound is generated.

The string sound model channels 63A to 63C are arranged for three strings per channel for a note of the piano as described above. In the case of adopting dynamic assignment, the channels are fixed to three strings, and the processing operations of the waveform data (s63) of all the channels are unified. This structure simplifies the processing program structure and the hardware circuit structure, removes the necessity for dynamic change of the string structure, and has merits.

This respect has the same reason as why input of the waveform data of the stroke sound, which is unnecessary when keys corresponding to the 12 notes in the lowest register are not pressed, is allowed to each channel 63 corresponding to 12 notes of the lowest sounds when the resonance sound is generated according to treading on the damper pedal 12.

In the case of unifying the channel structure of each string model to the three-string model, when the three-string model is assigned to the note of the region of two strings or one string, sound generation may be controlled at the stage of processing to start output of excitation signal data. Adopting the setting of removing minute musical interval difference expressing musical intervals (unison (detune)) of the string can also simply deal with.

In addition, the structure is not limited thereto, for example, in the case where the string models for 88 notes are prepared to execute static assignment to assign each of the notes in a fixed manner.

Figure 10:
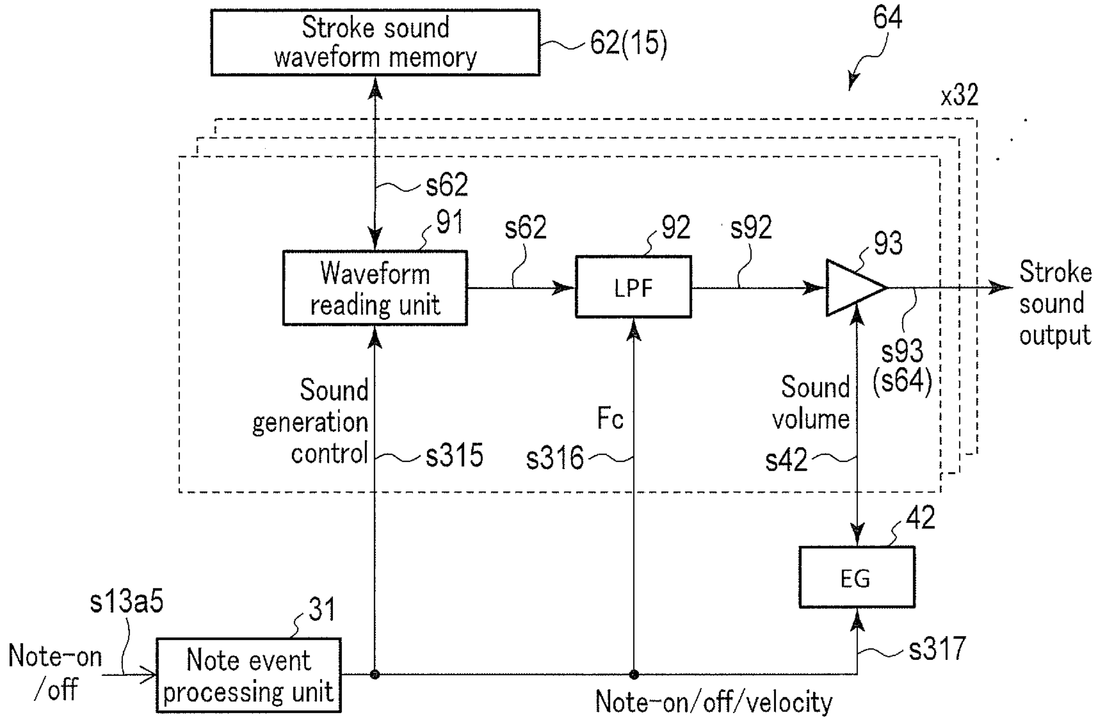
FIG. 10 is a block diagram mainly showing the signal processing configuration of a stroke sound generation channel according to the embodiment.

FIG. 10 is a block diagram mainly illustrating the detailed circuit configuration of the stroke sound generation channels 64 of FIG. 8. The stroke sound generation channels 64 include signal generation circuits of 32 channels by correspondence to the dynamic assignment method.

The following is an explanation of one of the stroke sound generation channels 64 as an example.

The note event processing unit 31 is supplied with the note-on/off signal s13*a*5 from the CPU 13A, and transmits a sound generation control signal s315 to a waveform reading unit 91, a signal s317 instructing note-on/off and velocity to the envelope generator (EG) 42, and a signal s316 instructing a cut-off frequency Fc corresponding to the velocity to the low-pass filter (LPF) 92.

The waveform reading unit 91 that has received the sound generation control signal s315 from the note event processing unit 31 reads out the instructed waveform data s62 from the stroke sound waveform memory 62 (ROM 15) storing the stroke sound waveform data s62 as the PCM sound source, and outputs the waveform data s62 to the low-pass filter 92.

The low-pass filter 92 passes, regarding the stroke sound waveform data s62, a component on the lower frequency side than the cut-off frequency Fc provided from the note event processing unit 31. In this manner, the low-pass filter 92 provides the stroke sound waveform data s62 with change in tone corresponding to the velocity, and outputs the stroke sound waveform data s62 as signal s92 to an amplifier 93.

The amplifier 93 executes sound volume adjustment processing on the basis of the signal provided from the envelope generator 42 and indicating the sound volume according to the stage of ADSR changing with a lapse of time in accordance with the velocity value from the note event processing unit 31, and outputs processed stroke sound channel waveform data s93 (s64) to the subsequent adder 65B.

As illustrated also in FIG. 8, the stroke sound channel waveform data s64 of 32 channels at most are synthesized and united with the adder 65B, and output to the adder 69 via the amplifier 66B, and also output to the string sound model channel 63 side dealing with a string sound musical sound signal via the amplifier 68B.

Figure 11:
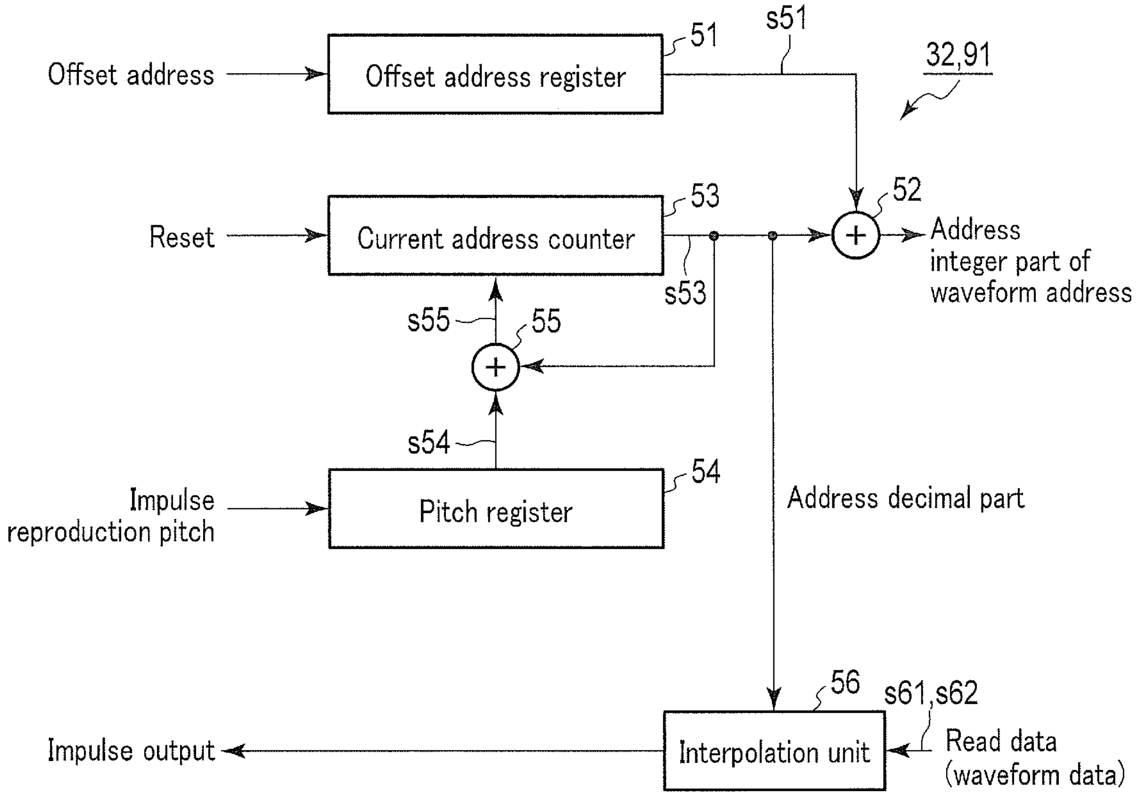
FIG. 11 is a block diagram showing the circuit configuration of a waveform reading unit according to the embodiment.

FIG. 11 is a block diagram illustrating a common circuit configuration of the waveform reading unit 32 reading string sound excitation signal waveform data s61 in the string sound model channel 63 of FIG. 9 and the waveform reading unit 91 reading stroke sound waveform data s62 in the stroke sound generation channel 64 of FIG. 10.

When key-pressing occurs in the keyboard unit 11, an offset address indicating a head address corresponding to the note number for which sound is to be generated and the velocity value is retained with an offset address register 51. The retained details s51 of the offset address register 51 is output to the adder 52.

By contrast, a count value s53 of a current address counter 53 that is reset to "0" at the initial stage of sound generation is output to the adder 52, an interpolation unit 56, and the adder 55.

The current address counter 53 serves as a counter successively increasing the count value with a result s55 of addition of a retained value s54 of a pitch register 54 retaining an impulse reproduction pitch and the count value s53 thereof with the adder 55. The impulse reproduction pitch serving as the set value of the pitch register 54 has a value "1.0" when the sampling rate of waveform data in the excitation signal waveform memory 61 or the stroke sound waveform memory 62 agrees with the string model in ordinary cases. By contrast, a value acquired by addition to or subtraction from the value "1.0" is provided as the impulse reproduction pitch when the pitch is changed by master tuning, stretch tuning, temperament, or the like.

The output (the integer part of the address) s52 of the adder 52 adding the offset address s51 from the offset address register 51 to the current address s53 from the current address counter 53 is output as the read address to the excitation signal waveform memory 61 (or the stroke sound waveform memory 62), and corresponding string sound excitation signal waveform data s61 (or stroke sound waveform data s62) is read out from the excitation signal waveform memory 61 (or the stroke sound waveform memory 62).

The read waveform data s61 (or s62) is subjected to interpolation with the interpolation unit 56 in accordance with the decimal part of the address output from the current address counter 53 and corresponding to the pitch, and thereafter output as an impulse output.

Figure 12:
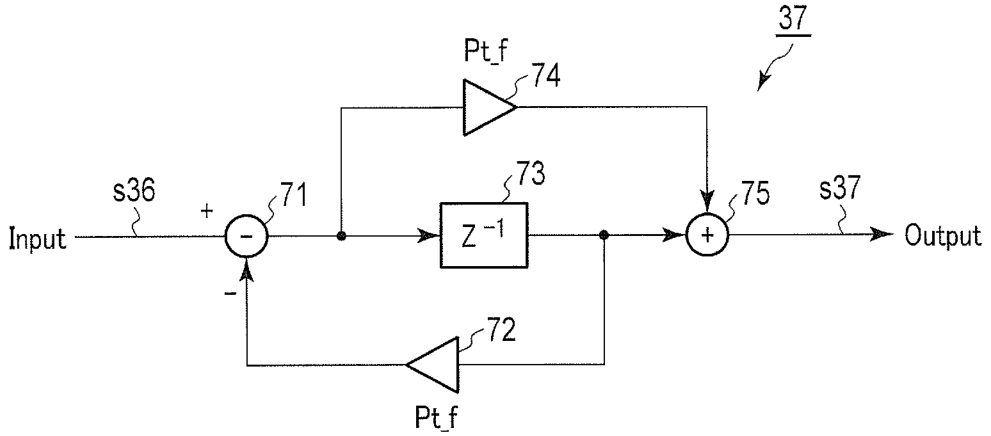
FIG. 12 is a block diagram showing the detailed circuit configuration of an all-pass filter in FIG. 9 according to the embodiment.

FIG. 12 is a block diagram illustrating the detailed circuit configuration of the all-pass filter 37 of FIG. 9. The output s36 from the delay circuit 36 of the previous stage is input to a subtracter 71. The subtracter 71 executes subtraction using waveform data of the previous sampling cycle output from the amplifier 72 as the subtrahend, and outputs waveform data serving as a difference therebetween to a delay retaining unit 73 and an amplifier 74. The amplifier 74 outputs waveform data attenuated according to the string length delay Pt_f to the adder 75.

The delay retaining unit 73 retains the transmitted waveform data, and outputs the waveform data with a delay for one sampling cycle (Z-1) to the amplifier 72 and the adder 75. The amplifier 72 outputs the waveform data attenuated in accordance with the string length delay Pt_f as the subtrahend to the subtracter 71. The sum output of the adder 75 is transmitted to the low-pass filter 38 of the subsequent stage, as waveform data s37 delayed by the time (time for one wavelength) determined in accordance with the input note number information (pitch information), together with the delay operation in the delay circuit 36 at the previous stage.

Figure 13:
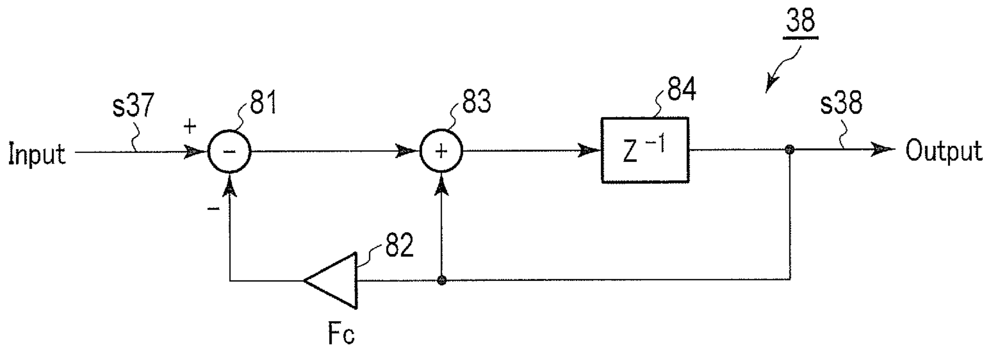
FIG. 13 is a block diagram showing the detailed circuit configuration of a low-pass filter in FIG. 9 according to the embodiment.

FIG. 13 is a block diagram showing the detailed circuit configuration of the low-pass filter 38 of FIG. 9. The delayed waveform data s37 from the all-pass filter 37 of the previous stage is input to the subtracter 81. The subtracter 81 is supplied with the waveform data output from the amplifier 82 and equal to or larger than the cut-off frequency Fc, as the subtrahend, and so waveform data on the lower frequency side smaller than the cut-off frequency Fc is calculated as a difference therebetween and output to an adder 83.

The adder 83 is also supplied with the waveform data of the previous sampling cycle output from a delay retaining unit 84, and waveform data serving as the sum thereof is output to the delay retaining unit 84. The delay retaining unit 84 retains waveform data transmitted from the adder 83 and delays the waveform data by one sampling cycle (Z-1) to generate waveform data s38 of the low-pass filter 38. The delay retaining unit 84 also outputs the waveform data s38 to the amplifier 82 and the adder 83.

As a result, the low-pass filter 38 passes waveform data on the lower frequency side than the cut-off frequency Fc [n] for high register attenuation set for the frequency of the string length, and outputs the waveform data to the amplifier 39 and the delay retaining unit 40 of the subsequent stage.

In the closed loop circuit, because the removing capability at the low-pass filter 38 is enhanced by repeated passage of the waveform data, a frequency of a relatively high value is generally adopted as the cut-off frequency Fc given to the amplifier 82.

[Operations]

The following is an explanation of operations according to the embodiment.

Figure 14:
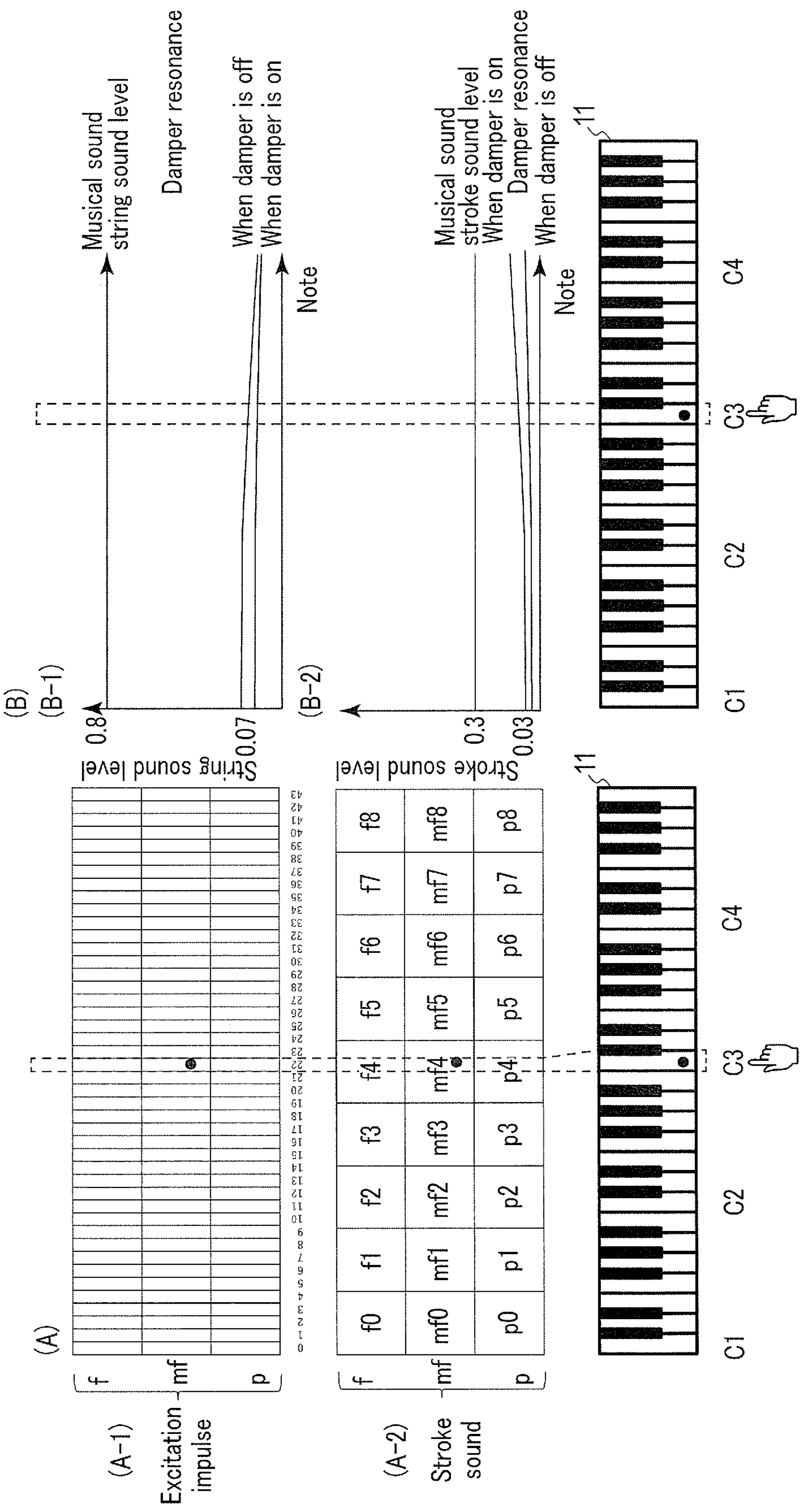
FIG. 14 is a diagram illustrating a map configuration of the excitation impulse of string sound and the waveform data of stroke sound read out and level changes in generated string sound and stroke sound according to key-pressed note and velocity according to the embodiment.

FIG. 14 is a diagram illustrating a map configuration of the excitation impulse of string sound and the waveform data of stroke sound read out and level changes according to time in generated string sound and stroke sound according to key-pressed note and velocity on the keyboard unit 11.

FIG. 14 (A) illustrates a process of determining read addresses of the memory of the excitation impulse of the string sound and each piece of waveform data of the stroke sound, for example, when the note of C3 is key-pressed at a velocity of mf (mezzo forte) in the keyboard unit 11.

As shown by (A-1) of FIG. 14 (A), the excitation impulse of the string sound stored in the excitation signal waveform memory 61 is prepared in correspondence with a note and a velocity of three stages: f (forte)/mf (mezzo forte)/p (piano), and the waveform data of the excitation impulse of the string sound corresponding to the memory address corresponding to key-pressing is read out. Regarding the notes, for example, the waveform data is divided into 44 stages in accordance with 48 notes, and the pitch of the read-out waveform data is appropriately adjusted according to the key-pressed note.

By contrast, as shown by (A-2) of FIG. 14 (A), the stroke sound waveform data stored in the stroke sound waveform memory 62 is prepared in correspondence with a velocity of three stages "f (forte)/mf (mezzo forte)/p (piano)" in the same manner as the note, and the stroke sound waveform data at the memory address "mf4" corresponding to the key-pressing is read out. Regarding the notes, for example, one piece of waveform data of stroke sound is shared by about five adjacent notes, and the pitch of the read-out waveform data is appropriately adjusted according to the key-pressed note.

As for the number of stages of the waveform data according to notes and velocities, for both string sound and stroke sound, the greater the number is, the higher the sound quality is, but doing so, the memory capacity required for the excitation signal waveform memory 61 and the stroke sound waveform memory 62 will increase.

In the present embodiment, the waveform data of a short excitation impulse in which the string sound is subjected to window-multiplying processing of two to three wavelengths is stored in the excitation signal waveform memory 61 and excited by the closed loop circuit to generate a string sound musical sound, whereas for the stroke sound, the waveform data stored in the stroke sound waveform memory 62 as the PCM sound source is made into a musical sound as it is.

Consequently, regarding the amounts of individual waveform data to be stored in the excitation signal waveform memory 61 and the stroke sound waveform memory 62, the amount of the waveform data of the excitation impulse of the string sound stored in the excitation signal waveform memory 61 is clearly smaller. Therefore, as also shown in FIG. 14 (A), it is considered to be appropriate to set the waveform data of the excitation impulse of the string sound more finely to increase the number of stages and reduce the number of notes sharing one piece of waveform data.

FIG. 14 (B) illustrates the levels of damper resonance corresponding to notes of the string sound and the stroke sound corresponding to the key-pressing on the keyboard unit 11. It is assumed that the string sound level and the stroke sound level can be set individually, and it may be possible to set each according to on/off of the damper resonance such that, for example, when the (string sound level, stroke sound level) in the state of not considering the damper resonance are (0.8, 0.3), they are (0.06, 0.03 (different depending on the note)) when the damper resonance is on, and (0.07, 0.02 (different depending on the note)) when the damper resonance is off (=when the string resonance is on).

As shown in FIG. 14 (B), it is also effective to set the string sound level and the stroke sound level for the damper resonance to the level according to a note to be key-pressed, and especially for notes at which the damper resonance tone is on the high register side, by setting the stroke sound level higher, the characteristics of the damper resonance tone including many harmonic tones in the high register can be faithfully reproduced.

Next, the ratio of addition of the string sound and the stroke sound will be described.

In the present embodiment, the addition ratio can be changed because the string sound model channels 63 and the stroke sound generation channels 64 are formed separately. In general, by increasing the ratio of the string sound, it is possible to reproduce a larger piano or a case where a listening point is far from the piano. In other words, it is considered that this is due to reasons such as the following:

Large pianos have long strings and large soundboards, so the vibrating sound of strings can be heard larger; and The sound of pianos is formed of fundamental sound and its harmonic tones, and the string sound with clear frequency peaks is easier for humans to recognize.

On the contrary, by increasing the ratio of the stroke sound, it is possible to reproduce a small piano or a musical sound when the listening point is close to the piano.

As mentioned above, the addition ratio can be changed by separately forming the channels that generate the string sound and the stroke sound, but a difference in the addition ratio between the musical sound and the damper resonance is due to the fact that, when the sound generated by key-pressing is transmitted to another string and resonates, there are many components that propagate through a bridge, and the propagating components have a large ratio of the stroke sound. Therefore, the damper resonance sound in which the components of the stroke sound are synthesized in a larger ratio becomes a sound similar to that of an acoustic piano.

Contents of a setting process corresponding to each operation will be described below. In each of the processes corresponding to the operations, the CPU 13A plays a central role in executing control.

Figure 15:
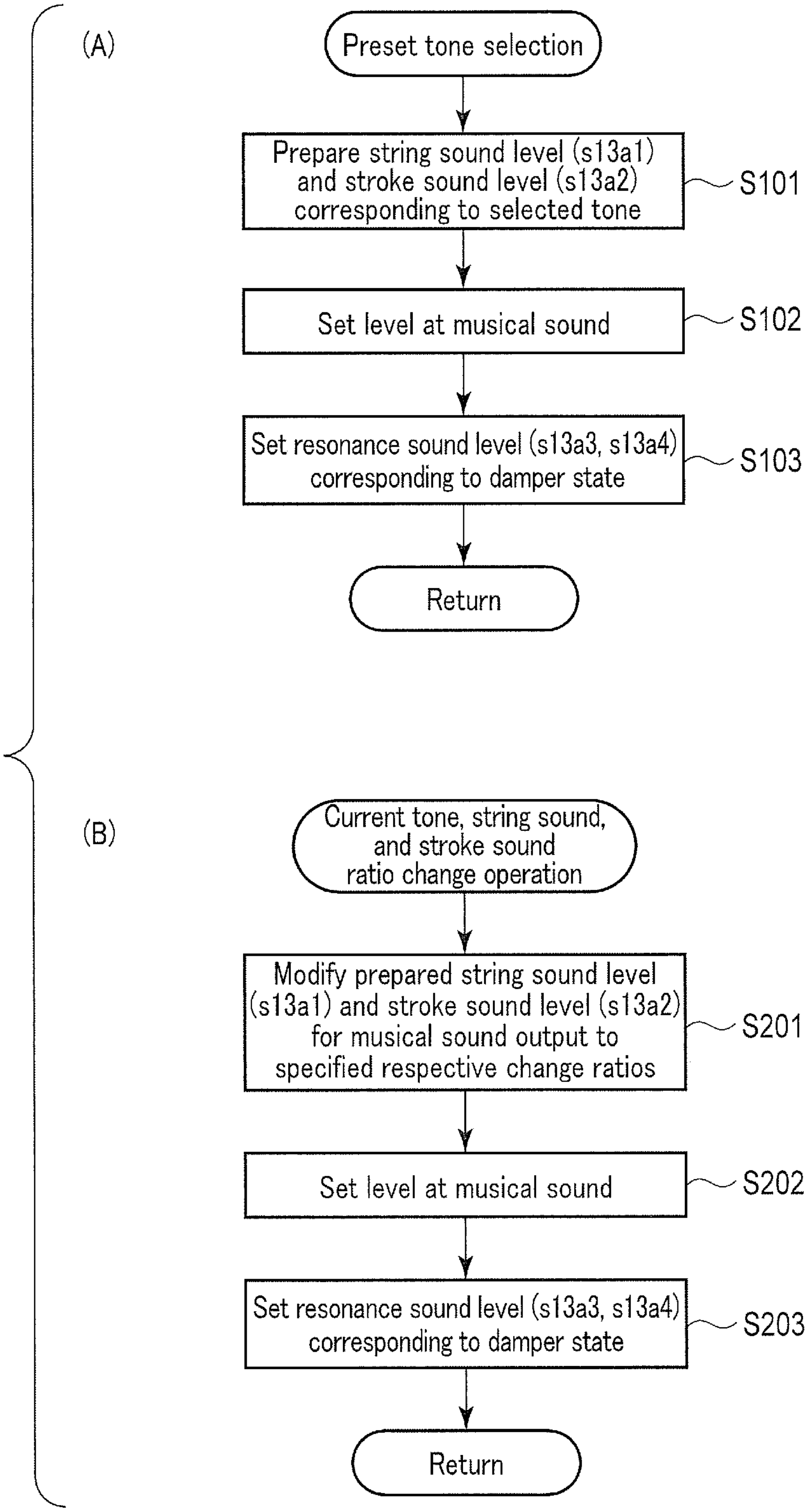
FIG. 15 is a flowchart illustrating processing contents when a preset tone is selected and when the change of a ratio of current tone, string sound, and stroke sound is operated according to the embodiment.

FIG. 15 (A) is a flowchart illustrating processing contents when a preset tone is selected. When the preset tone is selected, first, the CPU 13A prepares the string sound level (a13*a*1) and the stroke sound level (s13*a*2) corresponding to the selected tone as shown in (B-1) and (B-2) of FIG. 14 (B) (step S101). Next, the CPU 13A sets the level at the musical sound (step S102), sets the resonance level (s13*a*3, a13*a*4) corresponding to the state of the damper pedal 12 (step S103), ends the process corresponding to the selection of the preset tone, and returns to the process for waiting for a performance operation.

In this way, by selecting one from a plurality of preset tones, various additive synthesis ratios can be set, which simplifies complicated operations required before playing a musical instrument and facilitates actual handling while maintaining a variety of expressions.

As for the preset tones, for example, they are assumed to be set such that the stroke sound is louder when the damper pedal 12 is on, and the string sound is louder when the damper pedal 12 is off. Further, it is conceivable to set the level for damper resonance of the feedback value for resonance to about 1/10 with respect to the level for musical sound output.

FIG. 15 (B) is a flowchart illustrating processing contents when the operation to change the ratio of the current tone, the string sound, and the stroke sound is performed, executed in addition to the selection operation of the preset tone described in FIG. 15 (A). In processing, the CPU 13A first modifies the prepared string sound level (s13*al*) and stroke sound level (s13*a*2) for each musical sound output selected in the preset operation to respective specified change ratios according to the operation (step S201).

Further, the CPU 13A sets the level at the time of musical sound (step S202), sets the resonance sound level (s13*a*3, s13*a*4) according to the state of the damper pedal 12 (step S203), ends the process, and returns to the process for waiting for the performance operation.

In this way, regarding the individual ratio change operation of the current tone, the string tone, and the stroke sound, the process is to further arbitrarily adjust the preset level called by the user of the electronic keyboard musical instrument 10, and the user can freely set the tone which the user more likes according to the fine adjustment operation added to the preset selection.

Figure 16:
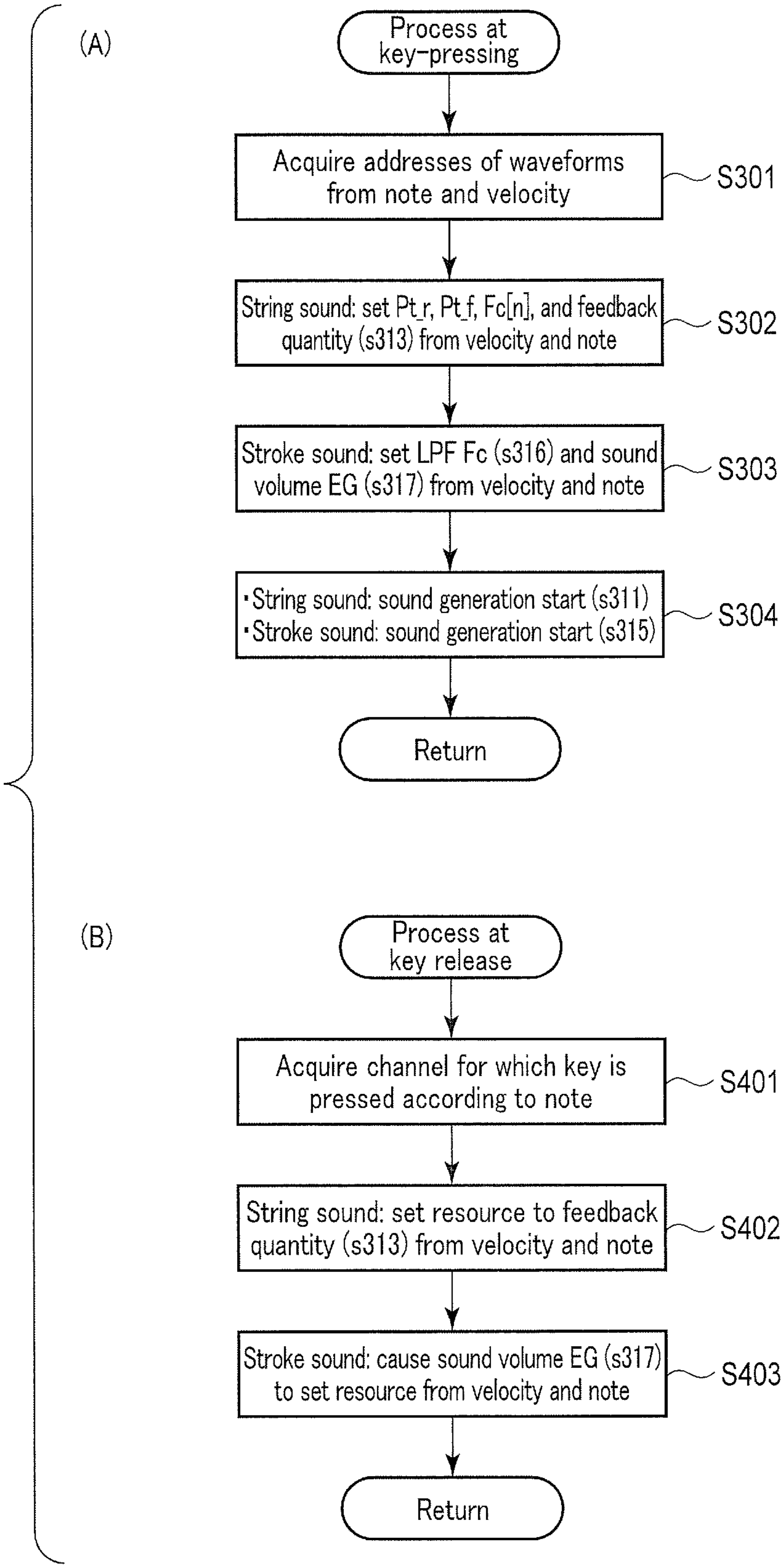
FIG. 16 is a flowchart illustrating processing contents of at key-pressing and at key release according to the embodiment.

FIG. 16 (A) is a flowchart illustrating processing contents executed by the CPU 13A at key-pressing on the keyboard unit 11. When a key is pressed on the keyboard unit 11, the CPU 13A acquires a read address shown in FIG. 14 (A) according to the key-pressed note and velocity and causes the excitation signal waveform memory 61 and the stroke sound waveform memory 62 to read the waveform data (s61) of the excitation impulse signal of the string sound and the waveform data (s62) of the stroke sound, respectively (step S301).

Regarding the string sound, at the same time, the CPU 13A sets the integer part Pt_r [n] of the strength length display of the delay time to the delay circuit 36 of the string sound model channel 63, the decimal part Pt_f [n] of the strength length display to the all-pass filter 37, the cutoff frequency Fc [n] of the low-pass filter 38, and the feedback quantity (s313) to the amplifier 39 with the note event processing unit 31 from the velocity and the note (step S302).

Regarding the stroke sound, the CPU 13A sets a cutoff frequency Fc (s316) to the low-pass filter 92 of the stroke sound generation channel 64 and a sound volume (s317) to the envelope generator 42 with the note event processing unit 31 from the velocity and the note (step S303).

After such setting, the CPU 13A immediately starts the string sound model channel 63 generating the string sound (s311), and the stroke sound generation channel 64 generating the stroke sound (s315) (step S304), ends the process corresponding to the key-pressing, and returns to the process for waiting for the next performance operation.

FIG. 16 (B) is a flowchart illustrating processing contents executed by the CPU 13A when a key-pressed note on the keyboard unit 11 is released. When the key is released on the keyboard unit 11, the CPU 13A first acquires the string sound model channel 63 and the stroke sound generation channel 64 that are generating sound according to the note that was key-pressed (step S401).

Then, regarding the string sound, the CPU 13A sets the amplifier 39 of the string sound model channel 63, which is a resource, to the feedback quantity (s313) according to the note and the velocity with the note event processing unit 31 (step S402).

Further regarding the string sound, the CPU 13A causes the envelope generator 42 to set the stroke sound generation channel 64, which is a resource, to the sound volume (s317) at the time of release (lingering sound) with the note event processing unit 31 from the velocity and the note (step S403), ends the process corresponding to the key release, and returns to the process for waiting for the performance operation.

Figure 17:
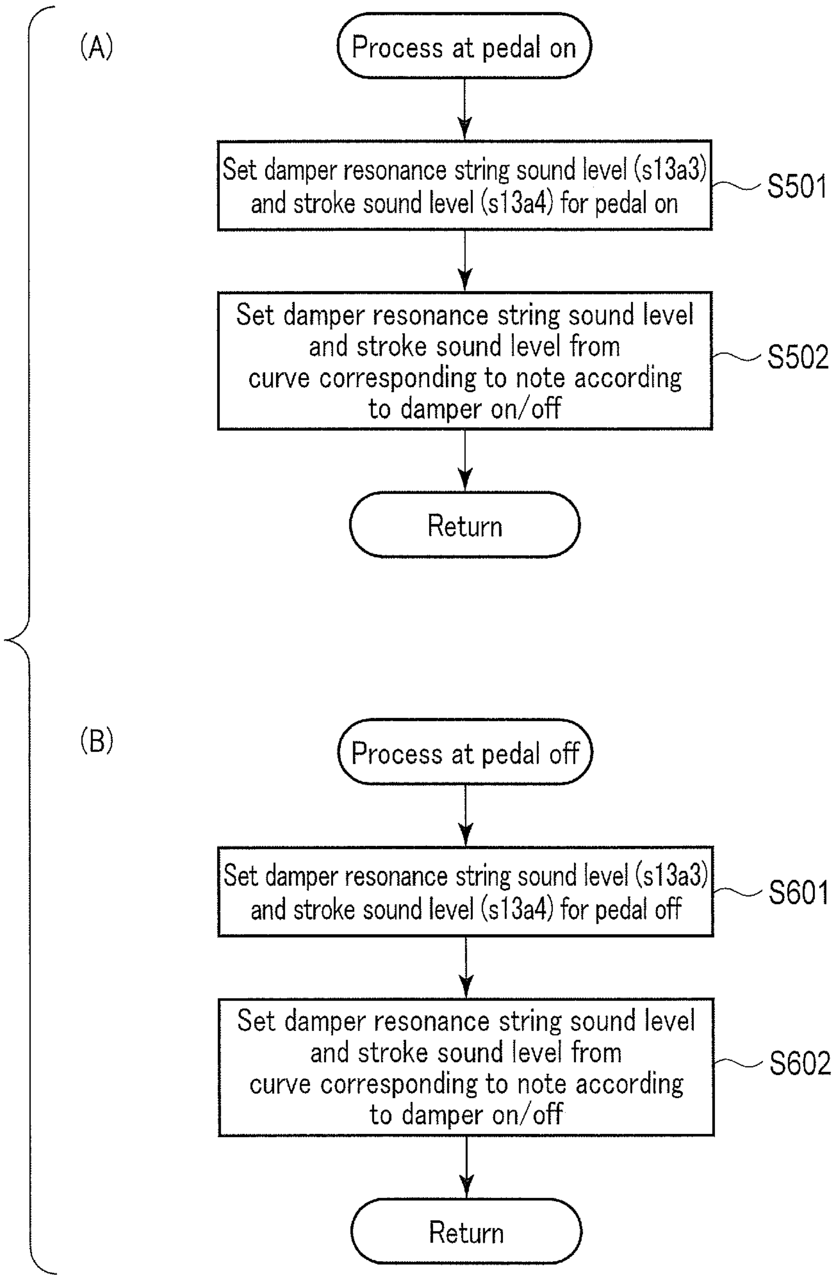
FIG. 17 is a flowchart illustrating processing contents of at the on operation and at the off operation of a damper pedal according to the embodiment.

FIG. 17 (A) is a flowchart illustrating processing contents executed by the CPU 13A when the damper pedal 12 is trodden and turned on.

At an early time when the damper pedal 12 is trodden on, the CPU 13A sets the amplifier 68A to the damper resonance string sound level (s13*a*3) for the on operation of the damper pedal 12 and sets the amplifier 68B to the damper resonance stroke sound level (s13*a*4) for the on operation of the damper pedal 12 (step S501).

Further the CPU 13A sets the damper resonance string sound level (s13*a*3) shown in FIG. 14 (B-1) and the damper resonance stroke sound level (s13*a*4) shown in FIG. 14 (B-2) corresponding to the note according to a further on/off operation of the damper pedal 12 (step S502), ends the process corresponding to the on operation of the damper pedal 12, and returns to the process for waiting for the performance operation.

FIG. 17 (B) is a flowchart illustrating processing contents executed by the CPU 13A at the off operation in which the depression of the damper pedal 12 is released.

At an early time when the depression of the damper pedal 12 is released, the CPU 13A sets the amplifier 68A to the damper resonance string sound level (s13*a*3) for the off operation of the damper pedal 12 and sets the amplifier 68B to the damper resonance stroke sound level (s13*a*4) for the off operation (step S601).

Further the CPU 13A sets the damper resonance string sound level (s13*a*3) shown in FIG. 14 (B-1) and the damper resonance stroke sound level (s13*a*4) shown in FIG. 14 (B-2) corresponding to the note according to a further on/off operation of the damper pedal 12 (step S602), ends the process corresponding to the off operation of the damper pedal 12, and returns to the process for waiting for the performance operation.

In this way, the damper resonance string sound level and stroke sound level are variably set according to treading on and releasing the damper pedal 12, so the string resonance and the damper resonance can be appropriately set according to the operation of the damper pedal 12.

In addition, regarding the setting of the damper resonance string sound level and stroke sound level described above, the one corresponding to the key-pressed note is set, so that the tone that more faithfully reproduces the musical sound of an actual acoustic piano or the like can be expressed.

In FIG. 8, the functional configuration of the entire hardware at the implementation level by the sound source DSP 13C, which generates the sound source channels of the string sound and the stroke sound is described, but a simpler configuration is also conceivable.

Figure 18:
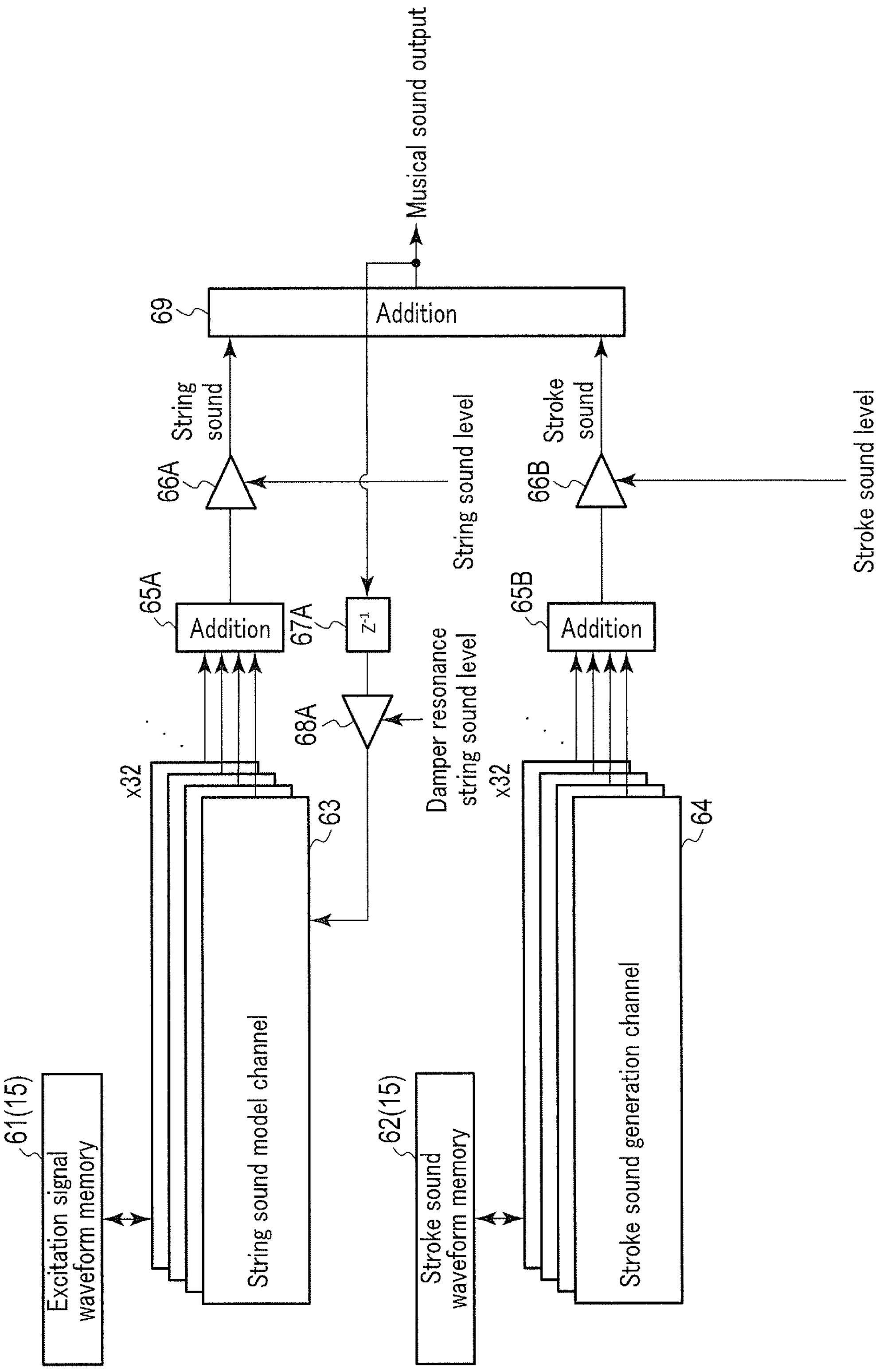
FIG. 18 is a block diagram illustrating another functional configuration of a hardware circuit generating the sound source channels of string sound and stroke sound at the implementation level according to the embodiment.

FIG. 18 is a block diagram illustrating a functional configuration alternative to FIG. 8. In FIG. 18, the adder 69 feeds back the addition result of the string sound musical sound signal and the stroke sound musical sound signal output to the D/A converting unit 13D of the next stage to the string sound model channel 63 via the delay retaining unit 67A and the amplifier 68A at the same time.

The amplifier 68A attenuates the musical sound signal delayed output by the delay retaining unit 67A according to the given damper resonance string sound level, and feeds it back to the string sound model channel 63.

As described above, the damper resonance string sound level is set to be switched so as to be different between when the damper pedal 12 is operated and when the damper pedal 12 is not operated, and the level of the resonance sound is set, but this switching setting may not be performed and the setting may be shared.

With such a functional configuration, it is possible to generate a realistic piano musical sound by the string sound and the stroke sound while simplifying the configuration as compared with the one shown in FIG. 8.

As described in detail above, according to the present embodiment, it is possible to favorably generate a natural musical sound without increasing the amount of calculation.

In the present embodiment, since the overlap of frequency ranges is avoided in the string sound component and the stroke sound component, it is possible to simplify control by treating each of them as independent.

Specifically, for example, since the additive synthesis ratios of the string sound and the stroke sound can be independently set, it is possible to enhance expressiveness such as the distance from a musical instrument can be expressed by the audible musical sound.

Further, in the present embodiment, since the closed loop circuit is provided with a path for feedback input of the resonance sound of the musical sound and the additive synthesis ratio of the string sound and the resonance sound can be set, it is possible to reproduce the musical sound with further increased expressiveness.

In the present embodiment, since the additive synthesis ratio of the resonance sound can be variably set according to presence/absence of the treading operation on the damper pedal 12, it is possible to express the musical sound with various tones also by the on/off of the damper operation.

Especially in the present embodiment, the additive synthesis ratio can be set for each note when the string sound musical sound of a plurality of notes is generated at the same time in accordance with a chord, it is possible to express a wider variety of tones.

In the present embodiment, since the additive synthesis ratio between the resonance sound and the string sound musical sound signal can be set by presence/absence of the operation of the damper pedal 12 for each note of the string sound musical sound signal, it is possible to express more detailed and elaborate tones.

As described above, the present embodiment describes when applied to the electronic keyboard musical instrument, but the present invention is not limited to musical instruments or specific models.

However, it is possible to generate a more realistic musical sound when expressing a musical sound containing many musical sound components of a frequency spectrum that cannot be expressed only by the fundamental sound and its regular harmonic tones of the string sound accompanied by a stroke motion on the strings such as, as the electronic musical instrument, not only the above-mentioned acoustic piano, but also various string beat musical instruments such as dulcimer, yangqin, and cymbalom, and when performing a performance method of striking the strings with fingers called "hammering on" even for string instruments such as acoustic guitar.

The invention of the present application is not limited to the embodiments described above, but can be variously modified in the implementation stage without departing from the scope of the invention. In addition, the embodiments may be suitably implemented in combination, in which case a combined effect is obtained. Furthermore, inventions in various stages are included in the above-described embodiments, and various inventions can be extracted by a combination selected from a plurality of the disclosed configuration requirements. For example, even if some configuration requirements are removed from all of the configuration requirements shown in the embodiments, the problem described in the column of the problem to be solved by the invention can be solved, and if an effect described in the column of the effect of the invention is obtained, a configuration from which this configuration requirement is removed can be extracted as an invention.

What is claimed is:

1. An electronic musical instrument comprising:
a plurality of playing operators specifying respective pitches and velocities; and
at least one processor,
wherein the at least one processor is configured to execute processing of:
acquiring window-multiplied waveform data corresponding to a specified pitch and a specified velocity;
acquiring string sound data including both a fundamental sound component and a harmonic tone component based on the window-multiplied waveform data;
acquiring stroke sound data that does not include the fundamental sound component nor the harmonic tone component corresponding to the specified pitch but includes components other than both the fundamental sound component and the harmonic tone component; and
synthesizing the string sound data and stroke sound data at a set ratio.

2. The electronic musical instrument according to claim 1, wherein the at least one processor is configured to execute processing of:
inputting excitation signal waveform data corresponding to the specified pitch in a closed loop including a process of delaying a time determined according to the specified pitch, wherein the closed loop outputs the string sound data according to the input; and
acquiring the string sound data output by the closed loop.

3. The electronic musical instrument according to claim 2, further comprising
a memory that has stored the excitation signal waveform data and stroke sound waveform data, wherein:
the string sound data is output from a string sound model channel including a closed loop of the excitation signal waveform data acquired from the memory according to an input to the string sound model channel; and
the stroke sound data is output from a stroke sound generation channel of the stroke sound waveform data acquired from the memory according to an input to the stroke sound generation channel.

4. The electronic musical instrument according to claim 1, wherein the at least one processor is configured to execute processing of:
detecting damper off indicating that a damper pedal is trodden on; and
in processing the synthesizing, synthesizing the string sound data and the stroke sound data according to the set ratio so that a synthesis ratio of the stroke sound data is higher when the damper off is detected than when the damper off is not detected.

5. The electronic musical instrument according to claim 1, wherein the at least one processor is configured to execute processing of:
in processing the synthesizing, synthesizing the string sound data and the stroke sound data according to the set ratio so that a synthesis ratio of the stroke sound data is higher when a second pitch higher than a first pitch is specified than when the first pitch is specified.

6. The electronic musical instrument according to claim 1, wherein the string sound data does not include any component other than both the fundamental sound component and the harmonic tone component.

7. An electronic keyboard musical instrument comprising:
a keyboard specifying respective pitches and velocities;
a tone selection operator; and
at least one processor,
wherein the at least one processor is configured to execute processing of:
acquiring window-multiplied waveform data corresponding to a specified pitch and a specified velocity;
acquiring string sound data including both a fundamental sound component and a harmonic tone component based on the window-multiplied waveform data;
acquiring stroke sound data that does not include the fundamental sound component nor the harmonic tone component corresponding to the specified pitch but includes components other than both the fundamental sound component and the harmonic tone component; and
synthesizing the string sound data and stroke sound data at a set ratio according to an operation of the tone selection operator.

8. The electronic keyboard musical instrument according to claim 7,
wherein the string sound data does not include any component other than both the fundamental sound component and the harmonic tone component.

9. A method of generating musical sound comprising,
executing, by at least one processor of an electronic musical instrument, processing of:
acquiring window-multiplied waveform data corresponding to a specified pitch and a specified velocity;
acquiring string sound data including both a fundamental sound component and a harmonic tone component based on the window-multiplied waveform data;
acquiring stroke sound data that does not include the fundamental sound component nor the harmonic tone component corresponding to the specified pitch but includes components other than both the fundamental sound component and the harmonic tone component; and
synthesizing the string sound data and stroke sound data at a set ratio.

10. The method according to claim 9, further comprising, executing, by the at least one processor, processing of:

inputting excitation signal waveform data corresponding to the specified pitch in a closed loop including a process of delaying a time determined according to the specified pitch, wherein the closed loop outputs the string sound data according to the input; and acquiring the string sound data output by the closed loop.

11. The method according to claim 10, further comprising, executing, by the at least one processor, processing of:

outputting the string sound data from a string sound model channel including a closed loop of the excitation signal waveform data according to an input to the string sound model channel; and outputting the stroke sound data from a stroke sound generation channel of stroke sound waveform data acquired from a memory according to an input to the stroke sound generation channel.

12. The method according to claim 9, further comprising, executing, by the at least one processor, processing of:

detecting damper off indicating that a damper pedal is trodden on; and in processing of the synthesizing, synthesizing the string sound data and the stroke sound data according to a set ratio so that a synthesis ratio of the stroke sound data is higher when the damper off is detected than when the damper off is not detected.

13. The method according to claim 9, further comprising, executing, by the at least one processor, processing of, in processing of the synthesizing, synthesizing the string sound data and the stroke sound data according to a set ratio so that a synthesis ratio of the stroke sound data is higher when a second pitch higher than a first pitch is specified than when the first pitch is specified.

14. The method according to claim 9, wherein the string sound data does not include any component other than the fundamental sound component and the harmonic tone component.

* * * * *